(12) United States Patent
Taherzadeh Boroujeni et al.

(10) Patent No.: US 12,401,452 B2
(45) Date of Patent: Aug. 26, 2025

(54) PDCCH INTERLEAVING ENHANCEMENT FOR MONITORING AGGREGATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Peter Gaal, San Diego, CA (US); Iyab Issam Sakhnini, San Diego, CA (US)

( * ) Notice: Subject to any disclaimer, the term of this patent is extended or adjusted under 35 U.S.C. 154(b) by 760 days.

(21) Appl. No.: 17/348,372

(22) Filed: Jun. 15, 2021

(65) Prior Publication Data

US 2021/0391948 A1    Dec. 16, 2021

Related U.S. Application Data

(60) Provisional application No. 63/039,904, filed on Jun. 16, 2020.

(51) Int. Cl.
*H04W 72/04* (2023.01)
*H04L 1/00* (2006.01)
*H04W 72/23* (2023.01)

(52) U.S. Cl.
CPC ........... *H04L 1/0071* (2013.01); *H04W 72/23* (2023.01)

(58) Field of Classification Search
CPC ....... H04L 1/08; H04L 1/0071; H04L 1/0072; H04L 1/04; H04L 1/1812; H04L 5/0053;
(Continued)

(56) References Cited

U.S. PATENT DOCUMENTS 10,912,073 B2 * 2/2021 Kwak ................... H04W 72/23
10,951,359 B2 * 3/2021 Huang .................. H04L 5/0094
(Continued)

FOREIGN PATENT DOCUMENTS

KR        20190100887 A      8/2019
WO    WO-2019139955 A1 *   7/2019     ......... H04B 17/3912

OTHER PUBLICATIONS

International Search Report and Written Opinion—PCT/US2021/037700—ISA/EPO—Oct. 4, 2021.

*Primary Examiner* — Edan Orgad
*Assistant Examiner* — Vanneilian Lalchinthang

(57) ABSTRACT

A user equipment (UE) and base station may be configured to implement interleaving enhancement during an aggregated monitoring occasion. In some aspects, the UE may receive control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. Further, the UE may decode signals received on resources for the at least two PDCCH monitoring occasions based on the different interleaving parameter configurations for the at least two PDCCH monitoring occasion in the grouping of PDCCH monitoring occasions in the aggregated monitoring occasion.

28 Claims, 11 Drawing Sheets

(58) Field of Classification Search
CPC ... H04L 5/0091; H04L 27/0006; H04L 5/001; H04W 72/042; H04W 72/23; H04W 72/1289; H04W 72/14; H04B 17/3912
USPC .......................................................... 370/329
See application file for complete search history.

(56) References Cited

U.S. PATENT DOCUMENTS

| | | | |
|---|---|---|---|
| 2018/0027483 A1* | 1/2018 | You | H04L 5/0053 370/336 |
| 2019/0140776 A1 | 5/2019 | Seo et al. | |
| 2019/0159213 A1* | 5/2019 | Baldemair | H04W 72/23 |
| 2019/0182807 A1* | 6/2019 | Panteleev | H04L 5/0048 |
| 2019/0223084 A1 | 7/2019 | John Wilson et al. | |
| 2019/0253308 A1* | 8/2019 | Huang | H04L 43/0823 |
| 2019/0297607 A1* | 9/2019 | Kim | H04W 72/23 |
| 2019/0335425 A1* | 10/2019 | Seo | H04L 5/0053 |
| 2020/0015258 A1 | 1/2020 | Zhou et al. | |
| 2020/0021419 A1* | 1/2020 | Taherzadeh Boroujeni | H04L 5/0091 |
| 2020/0092799 A1* | 3/2020 | Xu | H04W 74/006 |
| 2020/0221448 A1* | 7/2020 | Park | H04W 80/08 |

\* cited by examiner

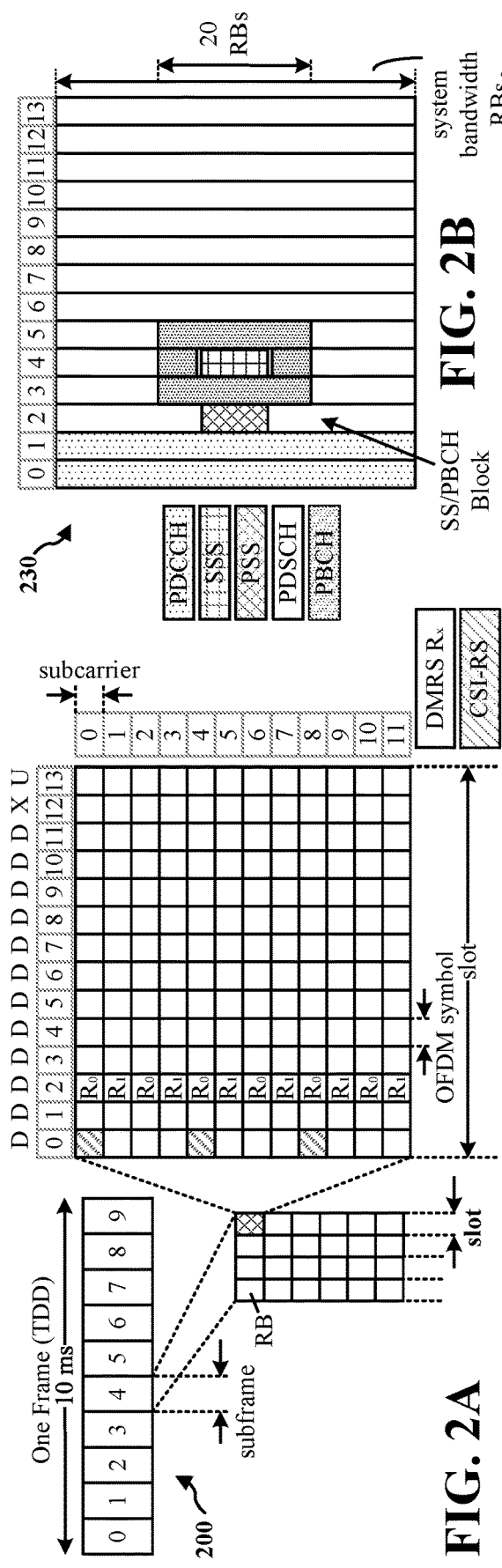
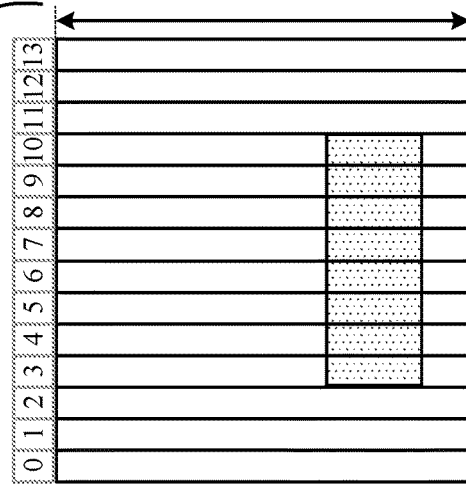
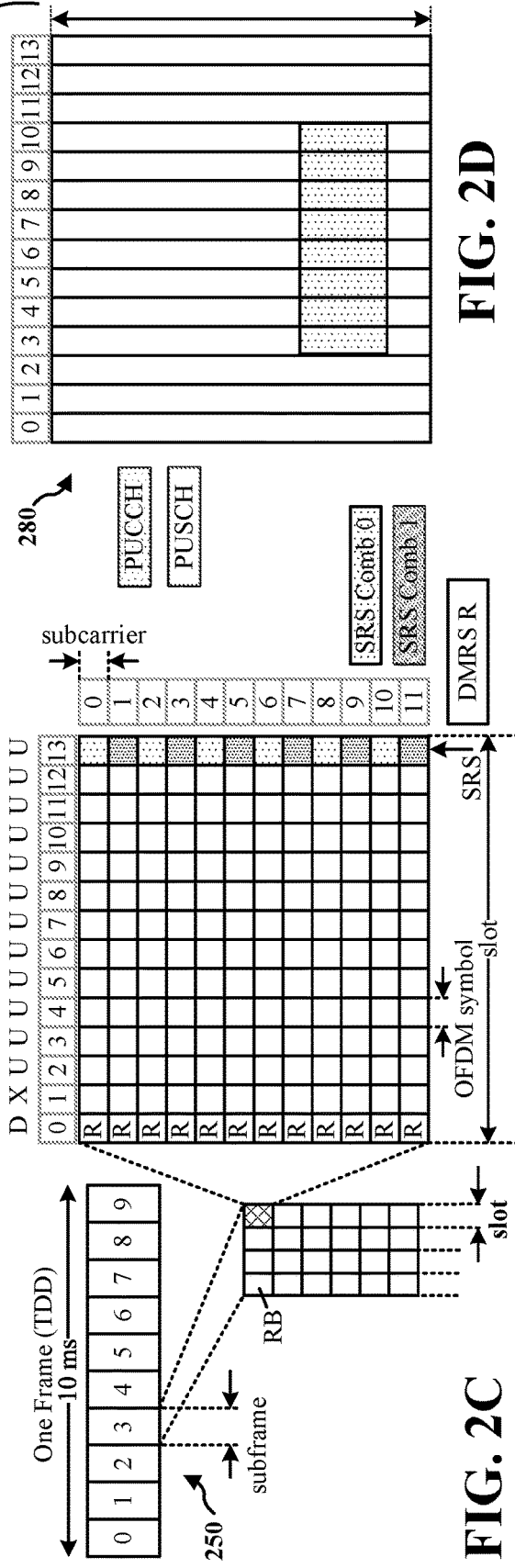

PDCCH INTERLEAVING ENHANCEMENT FOR MONITORING AGGREGATION

CROSS-REFERENCE TO RELATED APPLICATION

This application claims priority to U.S. Application No. 63/039,904, entitled "PDCCH INTERLEAVING ENHANCEMENT FOR MONITORING AGGREGATION," filed on Jun. 16, 2020, the disclosure of which is incorporated by reference herein in its entirety.

BACKGROUND

Technical Field

The present disclosure relates generally to wireless communication, and more particularly, to interleaving enhancements for physical downlink control channel (PDCCH) transmissions during a PDCCH monitoring aggregation mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

Wireless communication between a user equipment (UE) and a base station may benefit from beamforming. Beam reliability may be necessary to ensure that adequate coverage is provided for unicast channels between the UE and the base station, such as in Frequency Range 2 (FR2). For example, beam reliability may suffer for a variety of reasons such as a narrow beam becoming weak or suffering from partial shadowing. Improvements are presented herein to address beam reliability issues for the UE. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), comprising receiving control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The method further includes decoding signals received on resources for the at least two PDCCH monitoring occasions based on the different interleaving parameter configurations for the at least two PDCCH monitoring occasion in the grouping of PDCCH monitoring occasions in the aggregated monitoring occasion.

Another example implementation includes an apparatus for wireless communication at a user equipment (UE), comprising a memory and a processor in communication with the memory. The processor is configured to receive control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The processor is further configured to decode signals received on resources for the at least two PDCCH monitoring occasions based on the different interleaving parameter configurations for the at least two PDCCH monitoring occasion in the grouping of PDCCH monitoring occasions in the aggregated monitoring occasion.

Another example implementation includes an apparatus for wireless communication at a user equipment (UE), comprising means for receiving control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The apparatus further includes means for decoding signals received on resources for the at least two PDCCH monitoring occasions based on the different interleaving parameter configurations for the at least two PDCCH monitoring occasion in the grouping of PDCCH monitoring occasions in the aggregated monitoring occasion.

Another example implementation includes a computer-readable medium comprising stored instructions for wireless communication at a user equipment (UE), executable by a processor to receive control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The instructions are further executable to decode signals received on resources for the at least two PDCCH monitoring occasions based on the different interleaving parameter configurations for the at least two PDCCH monitoring occasion in the grouping of PDCCH monitoring occasions in the aggregated monitoring occasion.

An example implementation includes a method of wireless communication at a base station, comprising determining control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The method further includes transmitting the control resource set and search space configuration information including enhanced-coverage PDCCH procedure information to a user equipment (UE).

Another example implementation includes an apparatus for wireless communication at a base station, comprising a memory and a processor in communication with the memory. The processor is configured to determine control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The processor is further configured to transmit the control resource set and search space configuration information including enhanced-coverage PDCCH procedure information to a user equipment (UE).

Another example implementation includes an apparatus for wireless communication at a base station, comprising means for determining control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The apparatus further includes means for transmitting the control resource set and search space configuration information including enhanced-coverage PDCCH procedure information to a user equipment (UE).

Another example implementation includes a computer-readable medium comprising stored instructions for wireless communication at a base station, executable by a processor to determine control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. The instructions are further executable to transmit the control resource set and search space configuration information including enhanced-coverage PDCCH procedure information to a user equipment (UE).

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of UL channels within a 5G/NR subframe.

DETAILED DESCRIPTION

Figure 1:
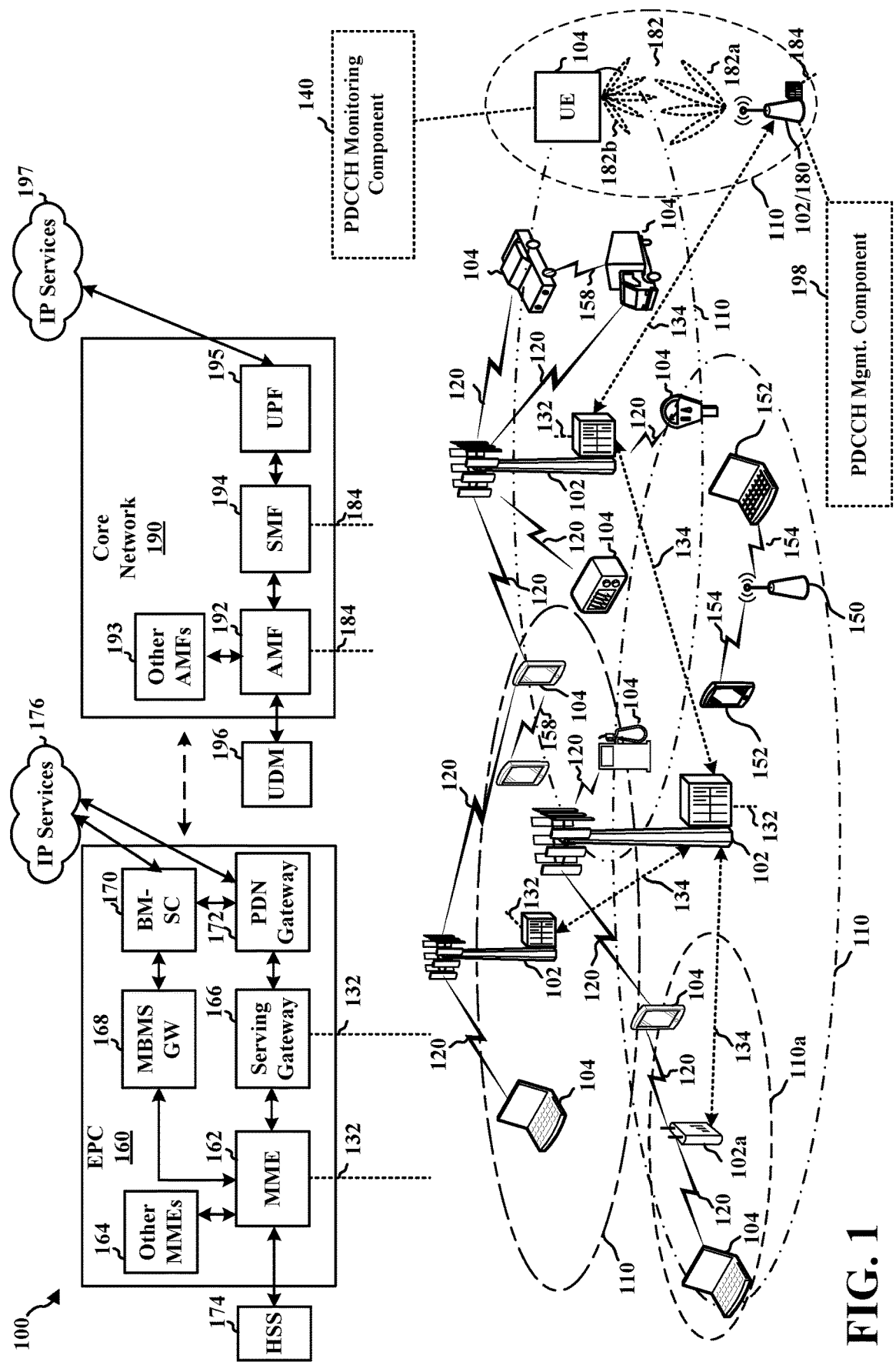
FIG. 1 is a diagram illustrating an example of a wireless communications system and an access network in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Wireless communication between a user equipment (UE) and a base station may involve beamforming. Beam reliability is a factor that helps to ensure that adequate coverage is provided for unicast channels between the UE and the base station, such as in Frequency Range 2 (FR2). For example, beam reliability may suffer for a variety of reasons such as a narrow beam becoming weak or suffering from partial shadowing. In addition, it is also important for the base station to obtain reliable channel state information (CSI) feedback from the UE so that the base station can provide new beam assignments to ensure that the UE can properly connect to the base station. Conditions that affect one UE, such as narrow cast beam becoming weak or suffering from partial shadowing, may affect a group of UEs that share the same, or a related, refined beam. UEs that are associated with different refined beams of a wider beam may also suffer similar kinds of beam-related problems. For example, a passing bus may result in attenuation or blockage for a group of UEs that are associated with different refined beams in correlated time spans.

A base station may transmit a physical downlink control channel (PDCCH) over a control resource set (CORESET). The CORESET may be the set of physical resources within a downlink resource grid that transmit the PDCCH. The information carried by the PDCCH may be referred to as downlink control information (DCI), and the information is mapped to physical resources in units referred to as control channel elements (CCEs). In particular, the PDCCH channel may be carried by one, two, four, eight, or sixteen CCEs to carry various DCI payload sizes or coding rates. In order to transmit the PDCCH over the CORESET, each CCE of a PDCCH may be mapped on a number of resource element groups (REGs), or REG bundles (e.g., sets of two or more REGS), in a CORESET. In some instances, the CCE-to-REG mapping may include block interleaving according to configured interleaving parameters.

Further, a base station may transmit repetitions of a PDCCH in an aggregated monitoring occasion to alleviate beam reliability issues and aid the UE in successfully receiving the PDCCH. Each aggregated monitoring occasion may be allocated with one or more CCEs. The transmission of repetitions of the PDCCH in the aggregated monitoring occasion may be referred to as an "enhanced-coverage PDCCH" procedure, and may effectively generate virtual CORESETs having a larger number of orthogonal frequency-division multiplexing (OFDM) symbols.

However, in some instances, utilizing the same interleaving parameters for each monitoring occasion in a group of monitoring occasions of an aggregated monitoring occasion when performing the CCE-to-REG mapping for the corresponding PDCCH may fail to provide frequency domain diversity over the aggregated monitoring occasion. As such, in these instances, the transmission reliability and robustness of the enhanced-coverage PDCCH procedure may be limited. Therefore, aspects presented herein provide PDCCH monitoring aggregation with interleaving enhancement, for example, utilizing repetitions of PDCCH over an aggregated monitoring occasion with different interleaving parameters for at least two monitoring occasions, and in some aspects for each monitoring occasion, for the group of monitoring occasions in the aggregated monitoring occasion. Such repetition of the same PDCCH with different interleaving parameters may improve PDCCH reception for a single UE, or for a group of UEs, that may be suffering from a weak or worsening beam by enabling the UE or UEs to decode and combine the PDCCH information from more than one monitoring occasion.

More specifically, various implementations relate generally to a procedure for PDCCH monitoring with interleaving enhancement. In some aspects, a base station transmits multiple repetitions of a PDCCH in multiple monitoring occasions of an aggregated monitoring occasion, where different interleaving parameter configurations are applied to the PDCCH for at least two of the aggregated monitoring occasions. Further, the UE may monitor for each of the multiple repetitions of the aggregated monitoring occasion and process the data received during the monitoring occasions based on control resource set and search space configuration information received from the base station. In some examples, the base station transmits an enhanced-coverage PDCCH procedure activation signal to activate the aggregated monitoring occasion for a grouping of monitoring occasions at the UE. In some examples, the enhanced-coverage PDCCH procedure activation signal may be a radio resource control (RRC) configuration message including an activation indication, a media access control (MAC) control element (CE) including an activation signal, a UE specific downlink control information (DCI) including an activation signal, or a group-common DCI including an activation signal. In some examples, the base station determines whether to send the enhanced-coverage PDCCH procedure activation signal based at least in part on a frequency band associated with the base station, a size of a control resource set associated with the PDCCH, and/or a subcarrier spacing value. In some examples, different interleaving parameters are applied to the PDCCH for each monitoring occasion. In some examples, the different interleaving parameter configurations comprise at least one of a different number of rows or a different number of cyclic shifts used in the interleaving procedure. In some examples, the interleaving parameter configurations applied to a PDCCH may be determined based at least in part on an initial symbol of a corresponding monitoring occasion.

Particular implementations of the subject matter described in this disclosure can be implemented to provide frequency domain diversity in an enhanced-coverage PDCCH procedure to ensure UEs that suffer from beam related problems will have appropriate coverage without excessive signaling overhead.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In one or more examples, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102*a,* employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some aspects of the present disclosure, one or more UEs 104 may include a PDCCH monitoring component 140 configured to enable the UE 104 to initiate the enhanced-coverage PDCCH procedure and properly process repetitions of the PDCCH having different interleaving configurations in the aggregated monitoring occasion. For example, the PDCCH monitoring component 140 may be configured to receive CORESET and search space configuration information from the base station 102/180. In some aspects, the CORESET and search space configuration may include enhanced-coverage PDCCH procedure information identifying an aggregated monitoring occasion and interleaving enhancement information indicating different interleaving parameter configurations for individual PDCCH monitoring occasions of the aggregated monitoring occasion. Further, the PDCCH monitoring component 140 may be configured to receive an enhanced-coverage PDCCH procedure activation signal to activate monitoring for a PDCCH in associated with the aggregated monitoring occasion, and decode signals received on resources during the individual PDCCH monitoring occasions of the aggregated monitoring occasion based on the interleaving parameter configuration associated with the respective PDCCH monitoring occasion.

In some aspects, a base station 102/180 may include a PDCCH management component 198 configured to generate the CORESET and search space configuration information and send the CORESET and search space configuration information to one or more UEs 104. Further, the PDCCH management component 198 may be configured to apply different interleaving parameter configurations to a PDCCH for at least two PDCCH monitoring occasions, or in some aspects each PDCCH monitoring occasion, in an aggregated monitoring occasion when transmitting the same PDCCH to the one or more UEs 104.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ32 5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
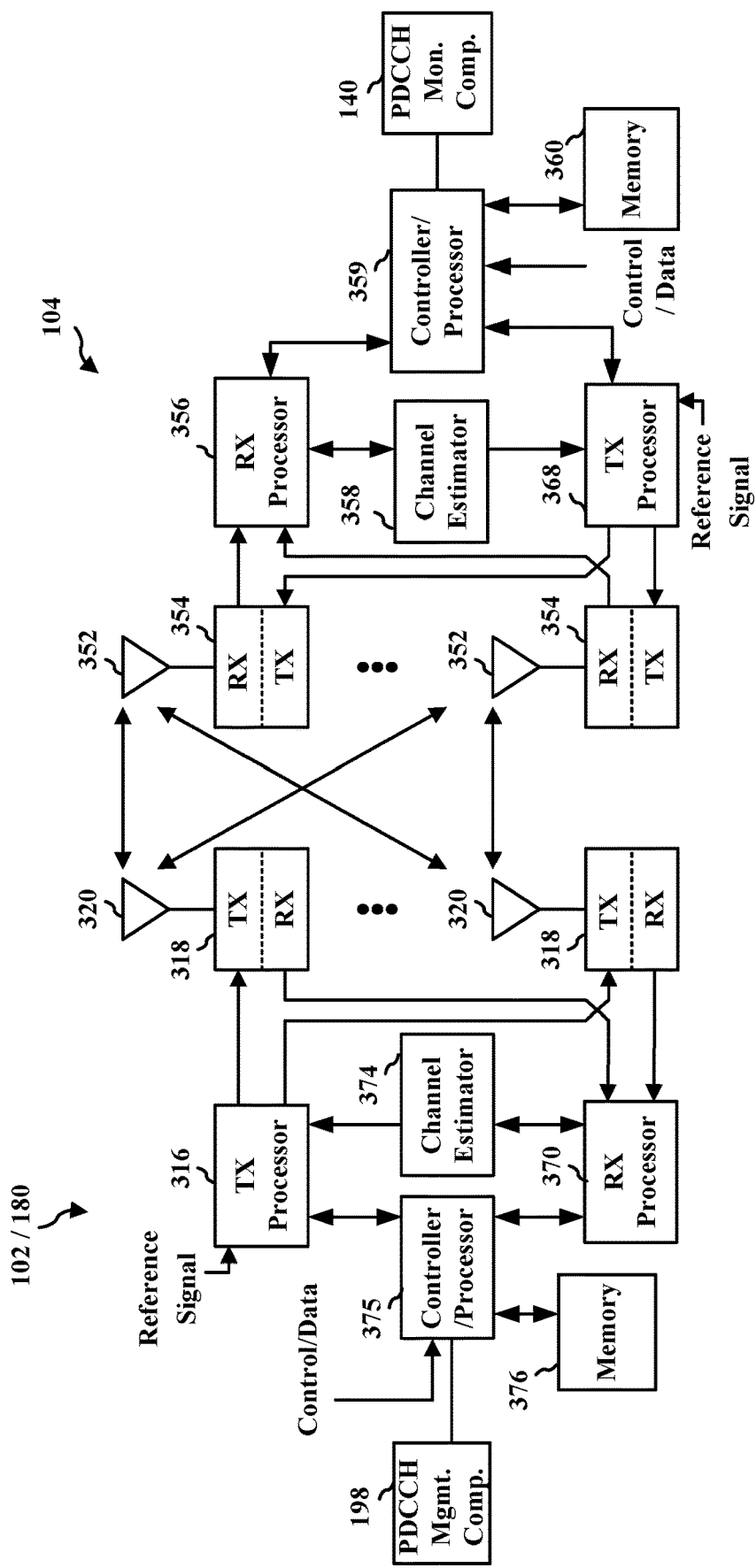
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the PDCCH monitoring component 140 of FIG. 1.

In the base station 102/180, at least one of the TX processor 316, the RX processor 370, and the controller/processor 375 may be configured to perform aspects in connection with PDCCH management component 198 of FIG. 1.

Figure 4:
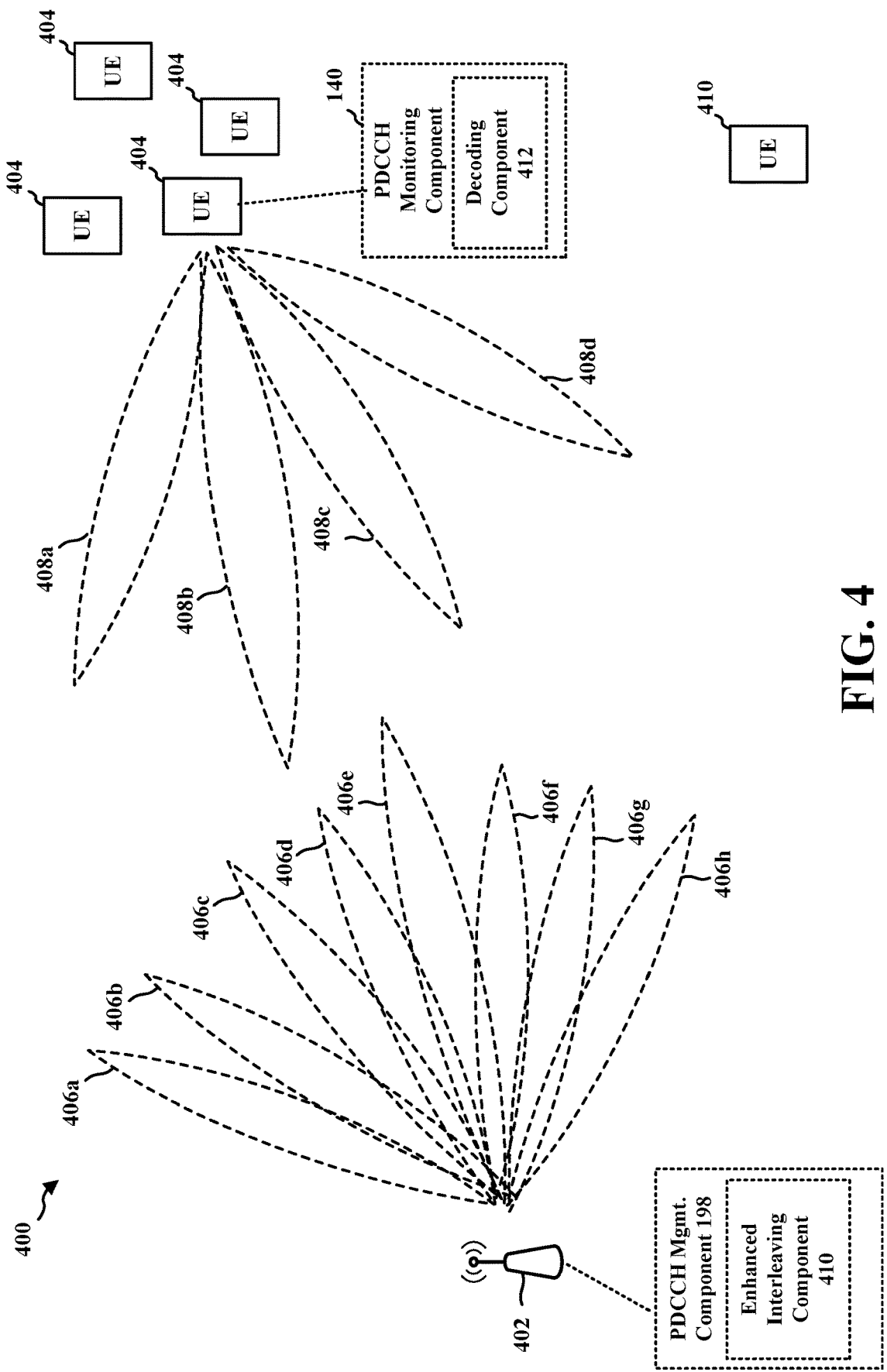
FIG. 4 is a diagram illustrating an example of beamforming between a base station and a UE in an access network in accordance with some aspects of the present disclosure.

FIG. 4 shows a diagram illustrating an example of beamforming 400 between a base station 402 and a UE 404 in an access network in accordance with some aspects of the present disclosure. As illustrated in FIG. 4, the base station 402 may transmit signals to the UE 404 in each of multiple directions using respective transmit beams 406(1)-(8). Further, the UE 404 may receive signals from the base station 402 using different receive beams 408(1)-(4). The UE 404 may also transmit a signal to the base station 402 in one or more of the directions using different beams. In addition, the base station 402 may receive the signal from the UE 404 in one or more of the receive directions using the one or more beams.

The base station 402 and the UE 404 may perform beam training to determine the best receive and transmit directions for each of the base station 402 and the UE 404. The transmit and receive directions for the base station 402 may or may not be the same. The transmit and receive directions for the UE 404 may or may not be the same. The base station 402 may use the same beam, or related beams, to transmit communication to multiple UEs 404. The base station 402 may use a different beam to exchange communication with the UE 404, for example. The base station 402 may provide reference signals to the UE 404 so that the UE 404 may perform further refined selection of the beam pairs 406(1)/408(1), 406(3)/408(3), 406(4)/408(4) based on measurements performed on those signals.

Under some conditions, PDCCH messages may not be received correctly, which may delay or prevent the UE 404 from receiving the control information in the PDCCH and exchanging other communications including data (for example, via a PDSCH) with the base station 402. For example, beam reliability may suffer for a variety of reasons, such as a narrow beam becoming weak or suffering from partial shadowing. The base station 402 may use channel state information (CSI) feedback from the UEs 404 or 406 to determine if current beam assignments are reliable and to ensure that the UEs 404 can properly receive communications from the base station 402. Conditions that affect one UE 404, such as a narrow beam becoming weak or suffering from partial shadowing, may affect some or all other UEs in a group of UEs 404 that share the same refined beam or a related refined beam. Beam refinement may include the use of one or more wider beams to select a narrower beam for communication. For example, the UEs 404 that are associated with different refined beams of a wider beam may also suffer similar types of beam-related problems. For example, a passing vehicle, or other mobile structure, may cause interference, attenuation or blockage for a group of UEs 404 associated with different refined beams in correlated time spans.

The base station 402 may alleviate issues with beam reliability by transmitting a PDCCH using an enhanced coverage procedure that involves transmitting multiple repetitions of the PDCCH over an aggregated monitoring occasion. The enhanced PDCCH procedure is also referred to herein as a "enhanced-coverage PDCCH" procedure or an "enhanced" PDCCH procedure. However, the base station 402 may use the same interleaving parameters when transmitting the multiple repetitions of the PDCCH, thereby leaving room for improvement in frequency domain diversity over the aggregated monitoring occasion. Aspects presented herein enable the base station 402 to improve transmission reliability and robustness by providing frequency domain diversity via interleaving enhancement.

The base station 402 may include a PDCCH management component 198, such as described in connection with FIG. 1. The PDCCH management component 198 may include an enhanced interleaving component 410 that provides different interleaving configurations for at least two monitoring occasions within an aggregated monitoring occasion to provide frequency diversity in the PDCCH transmissions. Further, the PDCCH management component 198 operating the enhanced interleaving component 410 may manage performance of a PDCCH monitoring aggregation mode with interleaving enhancement. For example, the PDCCH management component 198 may generate control resource set and search space configuration information including enhanced-coverage PDCCH procedure information corresponding to one or more aggregated monitoring occasions and interleaving enhancement information including interleaving parameter configurations applied to the PDCCH monitoring occasions of the aggregated monitoring occasions.

As used herein, in some aspects, "control resource set and search space configuration information" may refer to field information used to configure a CORESET and/or search space. In some aspects, control resource set and search space configuration information may include at least one of a CCE-to-REG mapping type, a CORESET identifier, duration information, frequency domain resource information, an interleaver size, scrambling information, a REG bundle size, a shift index, a precoder granularity, DCI information, a search space identifier, monitoring information (e.g., periodicity information, offset information, symbol information, etc.), aggregation information, a search space type, search space specificity information, DCI format, candidate information, etc. As used herein, in some aspects, "enhanced-coverage procedure information" may refer to at least one of an aggregation level or a data size associated with an aggregated monitoring occasion, or a duration, a repetition pattern, or other information regarding the aggregated monitoring occasion. As used herein, in some aspects, "interleaving parameter configuration" may refer to interleaving parameter configurations for PDCCH monitoring occasions associated with an aggregated monitoring occasion.

Further, PDCCH management component 198 may transmit enhanced-coverage PDCCH procedure activation signals indicating the initiation of an enhanced-coverage PDCCH procedure and enhanced-coverage PDCCH procedure deactivation signals indicating the termination of the enhanced-coverage PDCCH procedure. In some aspects, the enhanced-coverage PDCCH procedure activation signal may be a RRC configuration message including an activation indication, a MAC CE including an activation signal, a UE specific DCI including an activation signal, or a group-common DCI including an activation signal. The enhanced-coverage PDCCH procedure deactivation signal may be a RRC configuration message including a deactivation indication, a MAC CE including a deactivation signal, a UE specific DCI including a deactivation signal, or a group-common DCI including a deactivation signal.

The base station 402 may determine to transmit the enhanced-coverage PDCCH procedure activation signal based on one or more of: channel state information (CSI) received from at least one UE 404 in the group of UEs 404, a quality measurement for at least one UE 404 in the group of UEs 404, or hybrid automatic repeat request (HARQ) feedback from at least one UE 404 in the group of UEs 404. For example, the base station 402 may have previously received channel state information, quality measurements, or HARQ feedback from another UE and determine to transmit the enhanced-coverage PDCCH procedure activation signal to UE 404 based on this previously received information, measurements or feedback. The base station 402 may indicate the enhanced-coverage PDCCH procedure for all or a subset of search spaces of the group of UEs 404. Additionally, the base station may configure whether to activate coverage-enhance PDCCH procedure separately for each search space. For example, the base station may configure the enhanced-coverage PDCCH monitoring procedure to include one or more of an aggregation level or a size for PDCCH monitoring, a time window, a repetition pattern for the PDCCH, etc. Additionally, or alternatively, the base station 402 may determine to transmit the enhanced-coverage PDCCH procedure activation signal based at least in part on a frequency band associated with the base station, a size of a control resource set associated with the PDCCH, and/or a sub carrier spacing value.

The UEs 404 may each include a PDCCH monitoring component 140, such as described in connection with FIG. 1. As illustrated in FIG. 4, the PDCCH monitoring component 140 may include a decoding component 412 for decoding and processing the grouping of PDCCH monitoring occasions within the aggregated monitoring occasion based on the different interleaving parameter configurations for at least two of the PDCCH monitoring occasions. For example, the PDCCH monitoring component 140 operating the decoding component 412 may be configured to receive control resource set and search space configuration information including enhanced-coverage PDCCH procedure information corresponding to one or more aggregated monitoring occasions and interleaving enhancement information including interleaving parameter configurations applied to the PDCCH monitoring occasions of the aggregated monitoring occasions. In addition, the PDCCH monitoring component 140 may be configured to receive an enhanced-coverage PDCCH procedure activation signal from the base station 402, monitor for a same PDCCH over multiple PDCCH candidates in accordance with an aggregated monitoring occasion, and decode signals received on resources during the individual PDCCH monitoring occasions based on the different interleaving parameter configuration associated with the respective PDCCH monitoring occasion.

Under the configured enhanced-coverage PDCCH procedure for PDCCH monitoring, the base station 402 may transmit an initial transmission of a PDCCH and may repeat the PDCCH transmission as one or more repetitions so that the same PDCCH is repeated over two or more PDCCH monitoring occasions. The two or more PDCCH monitoring occasions may be grouped together as an aggregated set of monitoring occasions. The same PDCCH may be repeated over PDCCH candidates in multiple monitoring occasions, for example, in the same search space and with the same PDCCH candidate index. Further, each PDCCH may be mapped onto the CORESET using different interleaving parameters, as discussed below in more detail with respect to FIG. 8. For instance, in one example of how the interleaving may be varied, the PDCCH management component 198 operating the enhanced interleaving component 410 may perform an interleaving operation using the PDCCH and a first number of rows to determine a column of REG bundles. In addition, the PDCCH management component 198 may apply a first number of cyclic shifts to the column of REG bundles when mapping the PDCCH to the CORESET for a first monitoring occasion of the aggregated monitoring occasion, and apply a second number of cyclic shifts to the column of REG bundles when mapping the PDCCH to the CORESET for second monitoring occasion of the aggregated monitoring occasion. In addition, the UE 404 may employ the interleaving enhancement information to decode the CORESET and obtain the PDCCH. For example, the UE 404 may identify the interleaving parameter configuration corresponding to a monitoring occasion of an aggregated monitoring occasion based on symbol of the monitoring occasion, and use the identified interleaving parameter configuration to deinterleave the CORESET and obtain the PDCCH. In some aspects, the initial symbol of a monitoring occasion may be used as an index to identify the corresponding interleaving parameter configuration.

Additionally, in an implementation, the base station 402 may repeat the PDCCH transmission via the CORESET using different refined beams. In some examples, the different refined beams may each be a sub-beam of a beam corresponding to a transmission of the PDCCH. A sub-beam may refer to a lower level beam in a hierarchical set of beams. For example, a layer 1 (L1) beam may cover multiple L2 beams, which may each cover multiple L3 beams. In an implementation, the beam corresponding to a transmission of the PDCCH is an L2 beam and each of the different refined beams may be an L3 beam.

Each aggregated monitoring occasion may include k consecutive PDCCH monitoring occasions that correspond to the same search space. In some examples, each monitoring occasion may belong to a single aggregated monitoring occasion. For example, the aggregated monitoring occasion may be associated with an index n and may include monitoring occasions {4n, 4n+1, 4n+2, 4n+3}. In this example, for the aggregated monitoring occasion for n=0, the monitoring occasions include {0, 1, 2, 3}. For the aggregated monitoring occasion for n=1, the monitoring occasions include {4, 5, 6, 7}. For the aggregated monitoring occasion for n=2, the monitoring occasions include {8, 9, 10, 11}. Thus, each of the individual monitoring occasions belongs to only a single aggregated monitoring occasion, and the monitoring occasions in different aggregated monitoring occasion do not overlap. In some other examples, a single monitoring occasion may belong to multiple aggregated monitoring occasions. For example, the aggregated monitoring occasion may be associated with an index n and may include monitoring occasions {n, n+1, n+2, n+3}. In this example, for the aggregated monitoring occasion for n=0, the monitoring occasions include {0, 1, 2, 3}. For the aggregated monitoring occasion for n=1, the monitoring occasions include {1, 2, 3, 4}. For the aggregated monitoring occasion for n=2, the monitoring occasions include {2, 3, 4, 5}. Thus, monitoring occasion 2 and monitoring occasion 3 belong to the aggregated monitoring occasion for n=0, n=1, and n=2. Similarly, monitoring occasion 4 belongs to the aggregated monitoring occasions for n=1 and n=2.

Figure 5:
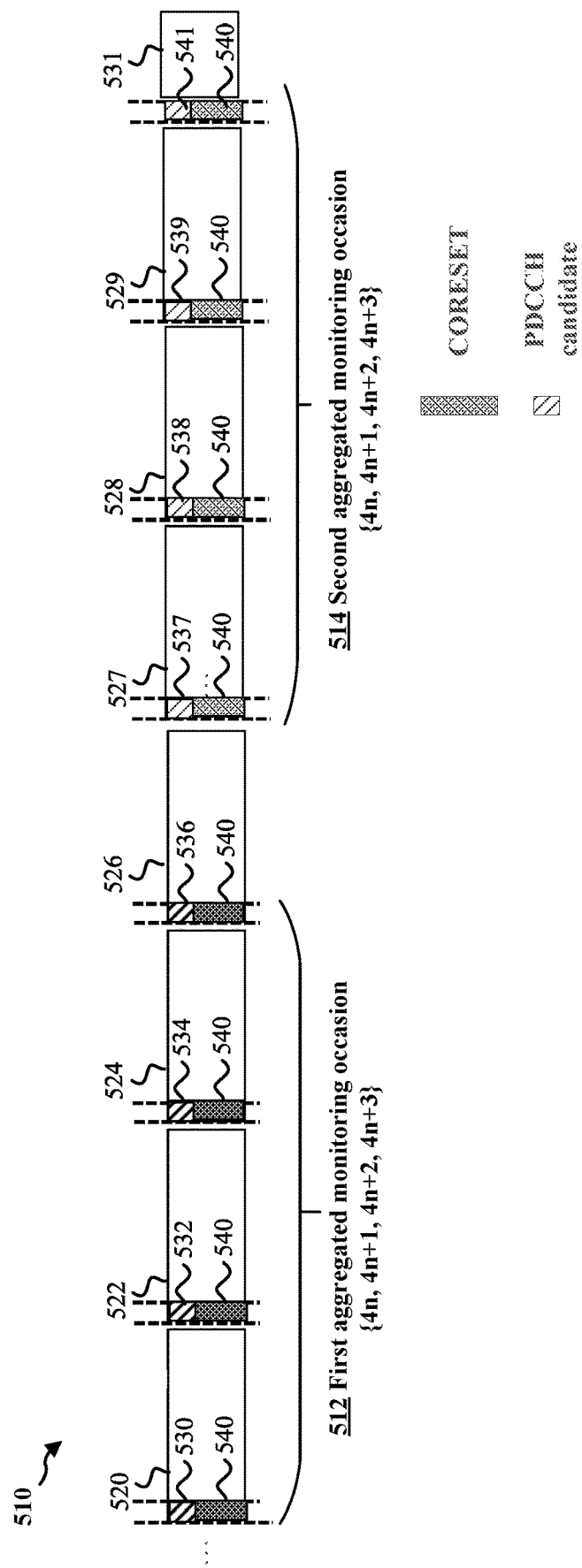
FIG. 5 is a diagram illustrating example aggregated monitoring occasions that are non-overlapping in accordance with some aspects of the present disclosure.

FIG. 5 includes a diagram illustrating example of a plurality of non-overlapping aggregated monitoring occasions 510 that include respective non-overlapping groupings of monitoring occasions in different aggregated monitoring occasions, wherein at least two of the monitoring occasions in each aggregated monitoring occasion have different interleaving parameter configurations in accordance with some aspects of the present disclosure. A first aggregated monitoring occasion 512 includes the monitoring occasions in slots 520, 522, 524, and 526. The base station 402 may transmit the same PDCCH over one or more of the multiple monitoring occasions. For example, the base station 402 may transmit the PDCCH on PDCCH candidate 530 in CORESET 540 of slot 520, and may transmit repetitions of the PDCCH in PDCCH candidates 532, 534, and 536 in CORESET 540 of slots 522, 524, and 526. That is, each of the PDCCH candidates 530, 532, 534, and 536 may include the same PDCCH. Although four slots are illustrated, the aspects presented herein may be applied to an aggregated monitoring occasion of any number of consecutive monitoring occasions.

A second aggregated monitoring occasion 514 includes the monitoring occasions in slots 527, 528, 529, and 531. The base station 402 may transmit the same PDCCH over one or more of the multiple monitoring occasions. For example, the base station 402 may transmit the PDCCH on PDCCH candidate 537 in CORESET 540 and may transmit repetitions of the PDCCH in PDCCH candidates 538, 539, and 541 in CORESET 540 of slots 528, 529, and 531. That is, each PDCCH candidate 537, 538, 539, and 541 may include the same PDCCH.

Figure 6:
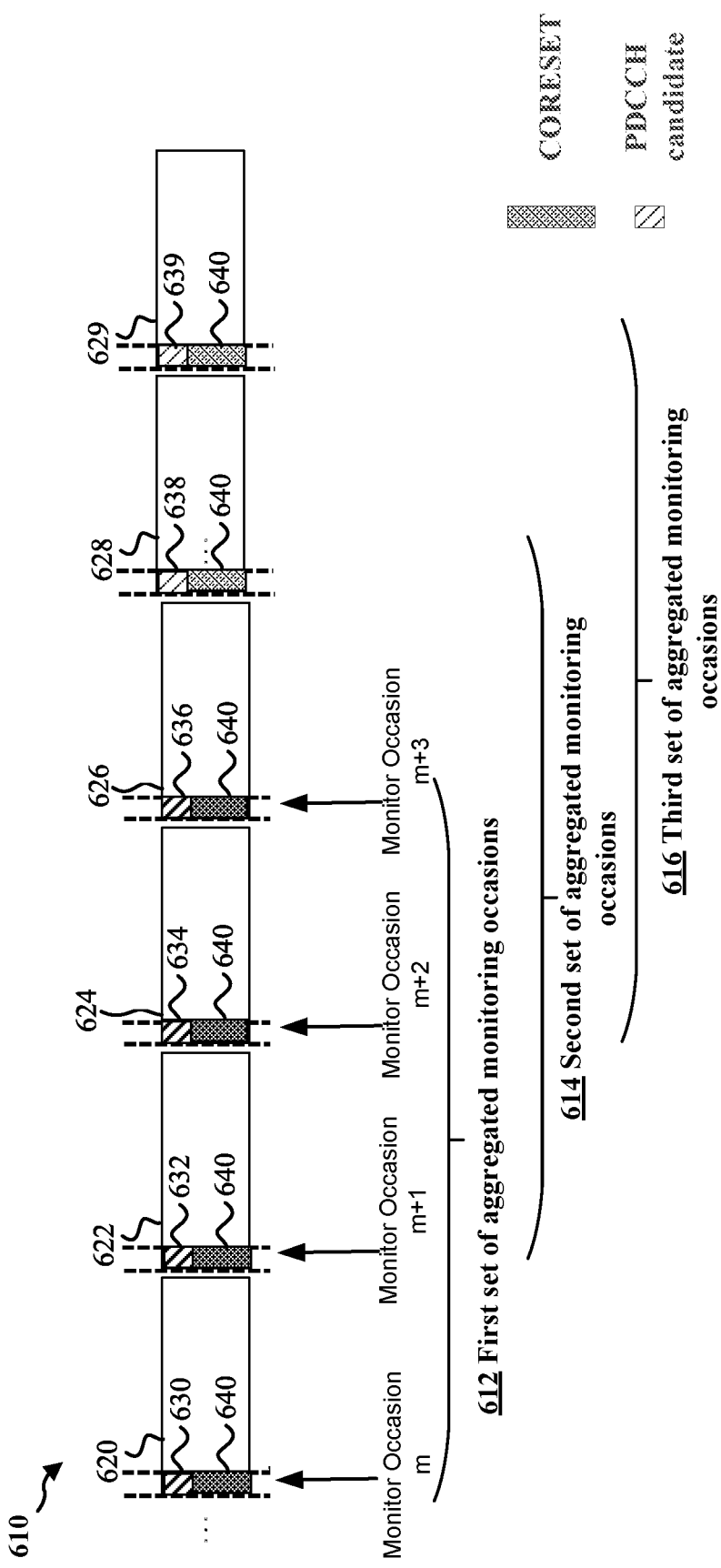
FIG. 6 is a diagram illustrating example aggregated monitoring occasions that are overlapping in accordance with some aspects of the present disclosure.

FIG. 6 is a diagram illustrating an example of a plurality of overlapping aggregated monitoring occasions 610, wherein at least two of the monitoring occasions in each aggregated monitoring occasion have different interleaving parameter configurations in accordance with some aspects of the present disclosure. A first aggregated set of monitoring occasions 612 includes the consecutive monitoring occasions in slots 620, 622, 624, and 626 in candidates 630, 632, 634, and 636 of the CORESET 640. A second aggregated set of monitoring occasions 614 includes the consecutive monitoring occasions in slots 622, 624, 626, and 628 in candidates 632, 634, 636, and 638 in the CORESET 640. A third aggregated set of monitoring occasions 616 includes the consecutive monitoring occasions in slots 624, 626, 628, and 629 in candidates 634, 636, 638, and 639 of the CORESET 640. As illustrated, individual monitoring occasions may belong to multiple aggregated sets of monitoring occasions. As an example, the aggregated sets of monitoring occasions may be based on {m, m+1, m+2, m+3}, which leads to some monitoring occasions belonging to multiple sets.

Figure 7:
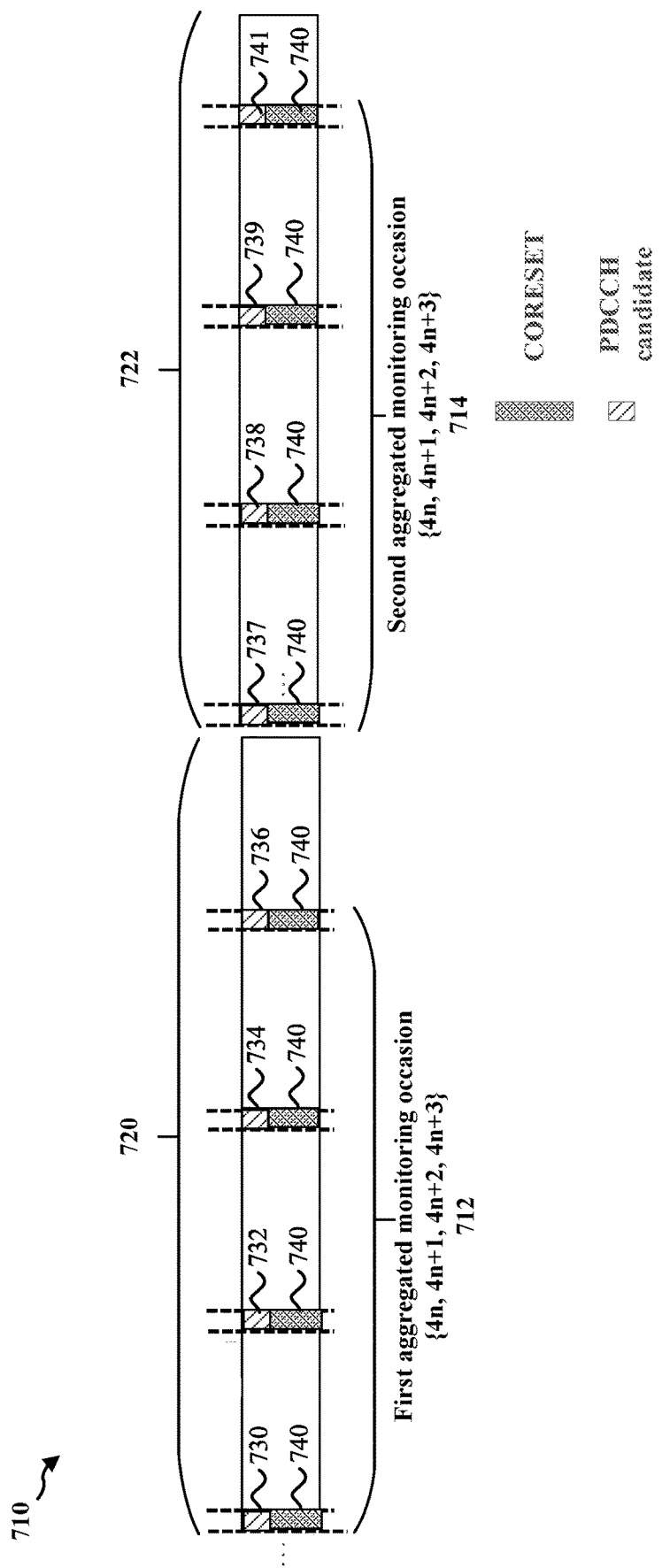
FIG. 7 is a diagram illustrating example aggregated monitoring occasions having multiple monitoring occasions in a common time slot in accordance with some aspects of the present disclosure.

FIG. 7 is a diagram illustrating an example of a plurality of aggregated monitoring occasions 710 having a grouping of monitoring occasions within a common time slot, wherein at least two of the monitoring occasions in each aggregated monitoring occasion have different interleaving parameter configurations in accordance with some aspects of the present disclosure. A first aggregated set of monitoring occasions 712 includes the monitoring occasions in slot 720. The base station 402 may transmit the same PDCCH over one or more of the multiple monitoring occasions. For example, the base station 402 may transmit the PDCCH on PDCCH candidate 730 in CORESET 740 of slot 720, and may transmit repetitions of the PDCCH in PDCCH candidates 732, 734, and 736 in CORESET 740 of slot 720. That is, each of the PDCCH candidates 730, 732, 734, and 736 may include the same PDCCH.

A second aggregated monitoring occasion 714 includes the monitoring occasions in slot 722. The base station 402 may transmit the same PDCCH over one or more of the multiple monitoring occasions. For example, the base station 402 may transmit the PDCCH on PDCCH candidate 737 in CORESET 540 and may transmit repetitions of the PDCCH in PDCCH candidates 738, 739, and 741 in CORESET 740 of slot 722. That is, each PDCCH candidate 737, 738, 739, and 741 may include the same PDCCH.

Figure 8:
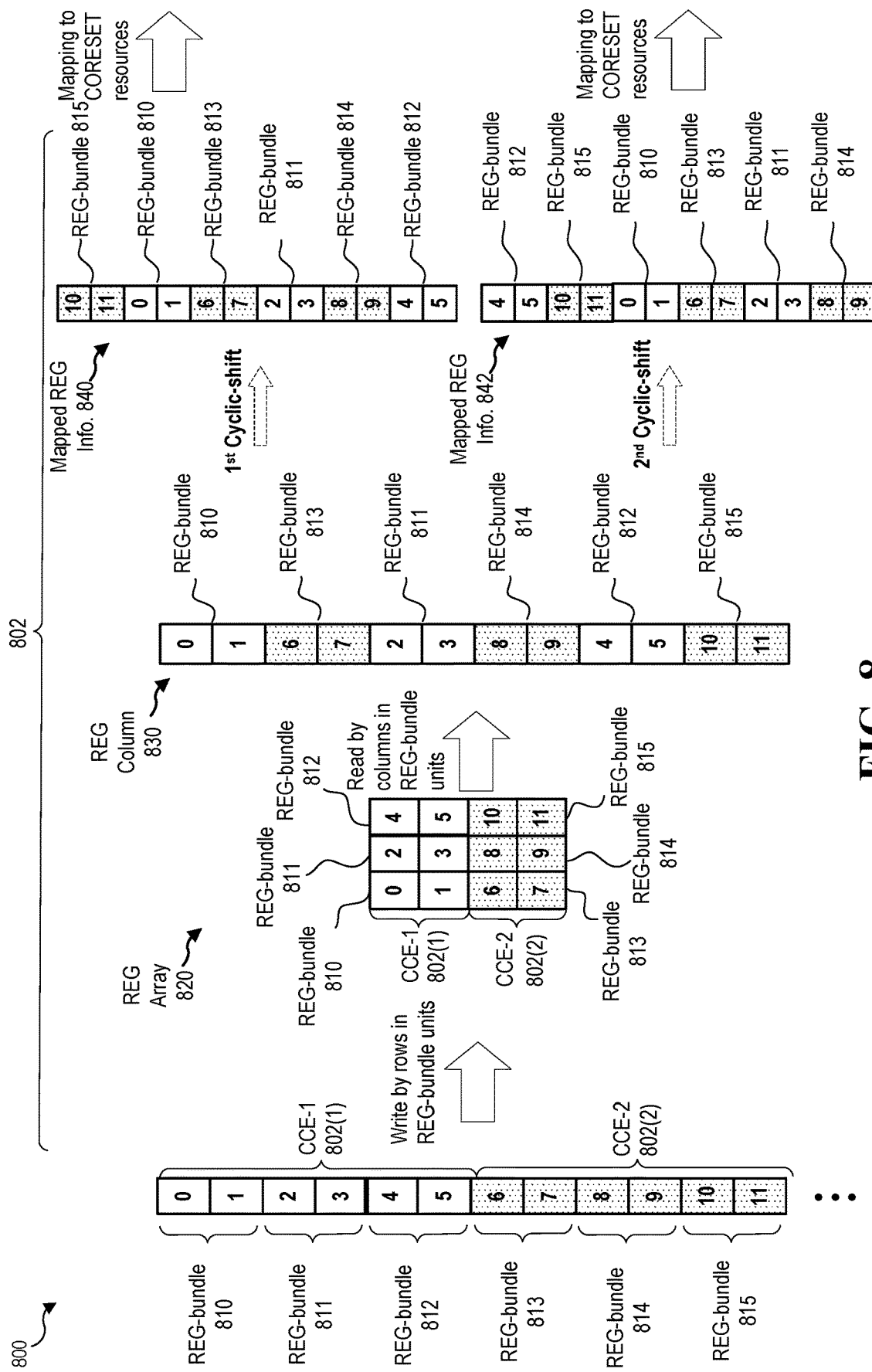
FIG. 8 is a diagram illustrating a PDCCH interleaving enhancement procedure for an aggregated monitoring occasion in accordance with some aspects of the present disclosure.

FIG. 8 illustrates an example enhanced interleaving process 800 for an aggregated monitoring occasion, wherein at least two of the monitoring occasions in each aggregated monitoring occasion have different interleaving parameter configurations according to some aspects of the present disclosure. As described herein, a base station 402 may transmit repetitions of the same PDCCH over multiple PDCCH candidates in multiple respective PDCCH monitoring occasions of an aggregated monitoring occasion. In this example, the PDCCH may be represented as a plurality of CCEs 802(1)-(N), where N is any positive whole number. Further, in this case, the CCEs 802(1)-(N) may include a plurality of REG bundles each including two REGs. For example, a first CCE 802(1) may include the REG bundles 810, 811, and 812, and a second CCE 802(2) may include the REG bundles 813, 814, and 815. In order to map the PDCCH on to a CORESET for transmission during a monitoring occasion of the aggregated monitoring occasion, an interleaving component (e.g., the enhanced interleaving component 410) may perform a block interleaving operation 802 on the REG bundles 810-815 wherein different interleaving parameters may be applied to a same PDCCH for more than one monitoring occasion. By this block interleaving operation 802 using different interleaving parameters, adjacent CCEs for a PDCCH are broken down into scattered REG bundles in the frequency domain.

For example, the base station 402 may generate a REG array 820 by placing the REG bundles 810-815 into a number of rows in accordance with a first interleaving parameter defining the number of rows of the REG array 820. Further, in some cases, the base station 402 may employ a first value as the first interleaving parameter for a first PDCCH monitoring occasion of the aggregated monitoring occasion, and another value for another PDCCH monitoring occasion of the aggregated monitoring occasion. As described in detail herein, employing different values for the number of rows when building the REG array 820 for different monitoring occasions of the aggregated monitoring occasion may provide frequency domain diversity over the aggregated monitoring occasion. In this example, the first interleaving parameter may be two rows. Alternatively, in some other aspects, the first interleaving parameter may be three rows or six rows or any other value that may be permitted, e.g., according to according to a technical specification for a particular communication protocol.

Further, the base station 402 may generate an REG column 830 by performing a column-wise reading of the REG bundles 810-815 out of the REG array 820. Once the base station 402 generates the REG column 830, in some cases, the base station 402 may apply a number of different cyclic shifts to the REG column 830 in accordance with a second interleaving parameter defining the number of cyclic shifts to perform on the REG column 830 for respective PDCCH monitoring occasions of the aggregated monitoring occasion.

For example, as illustrated in FIG. 8, the base station 402 may employ a first value (i.e., one cyclic shift) as the second interleaving parameter to determine mapped REG information 840 corresponding to the physical placement of the REG bundles 810-815 on the CORESET for a first monitoring occasion of the aggregated monitoring occasion, and a second value (i.e., two cyclic shifts) as the second interleaving parameter to determine mapped REG information 842 corresponding to the physical placement of the REG bundles 810-815 on the CORESET for a second monitoring occasion of the aggregated monitoring occasion. As described in detail herein, employing different values for the number of cyclic shifts when determining the physical placement of the REG bundles 810-815 on the CORESET for different monitoring occasions of the aggregated monitoring occasion may provide frequency domain diversity over the aggregated monitoring occasion.

One or both of the above operations may be similarly performed to determine the physical placement of each of a plurality of REG bundles on the CORESET for each of a plurality of different monitoring occasions of the aggregated monitoring occasion.

While the example of FIG. 8 includes two different cyclic shifts used to determine the physical placement of the plurality of REG bundles 810-815 on the CORESET for two different monitoring occasions of the aggregated monitoring occasion, it should be understood that the base station 402 may vary one or both of the first interleaving parameter (e.g., the number of rows) and the second interleaving parameter (e.g., the number of cyclic shifts) for at least two monitoring occasions of the aggregated monitoring occasion. In some cases, the base station 402 may vary one or both of the first interleaving parameter and the second interleaving parameter for each monitoring occasion of the aggregated monitoring occasion. Again, such varying of the vary one or both of the first interleaving parameter and the second interleaving parameter for at least two monitoring occasions of the aggregated monitoring occasion provides frequency domain diversity over the aggregated monitoring occasion.

Figure 9:
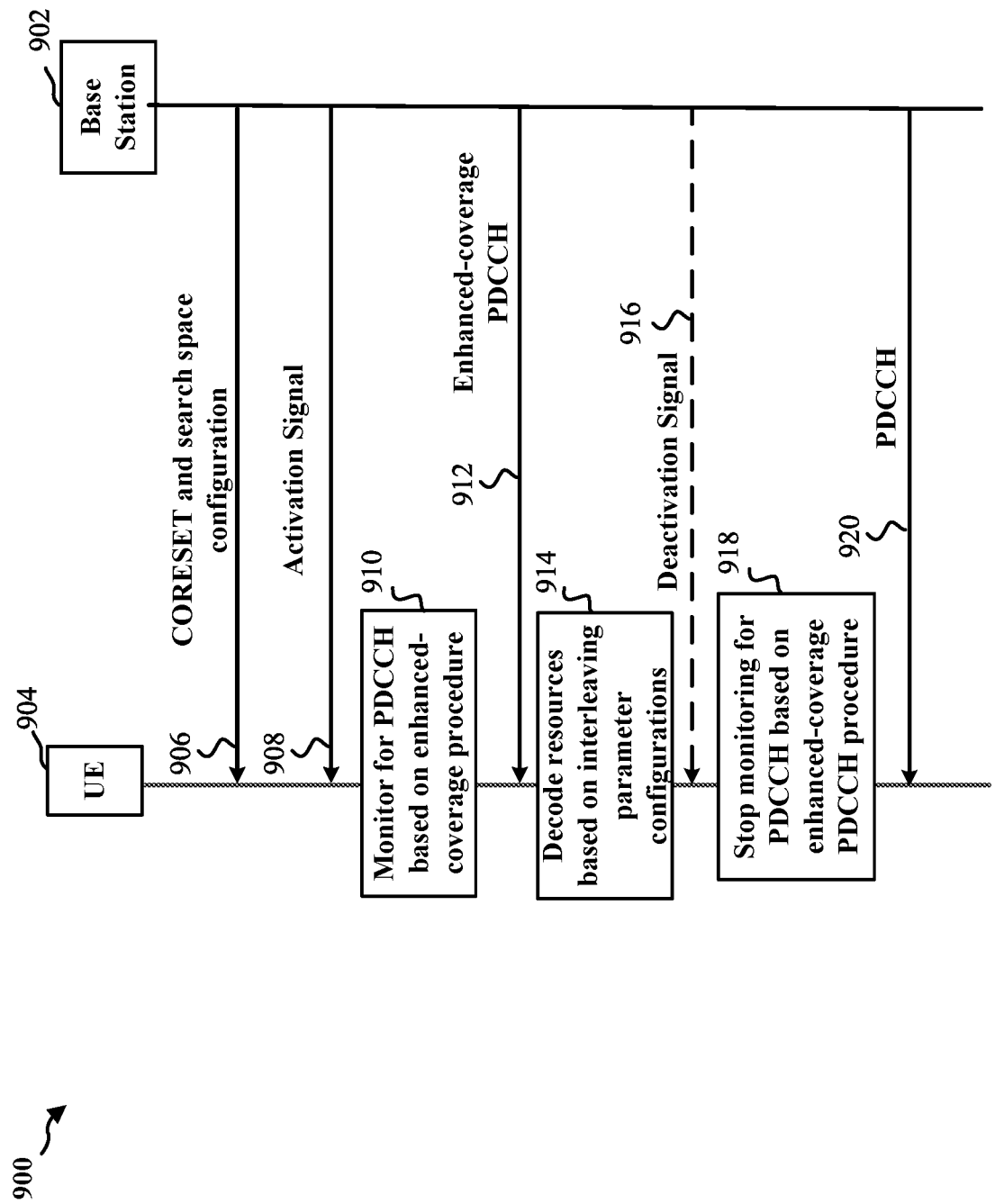
FIG. 9 is a communication flow between a base station and a group of UEs that supports a PDCCH interleaving enhancement procedure for an aggregated monitoring occasion in accordance with some aspects of the present disclosure.

FIG. 9 is a communication flow 900 between a base station 902 (e.g., the base station 402) and a UE 904 (e.g., the UE 404) that supports interleaving enhancement for a PDCCH aggregated monitoring occasion in accordance with some aspects of the present disclosure. In this example, the base station 902 transmits a CORESET and search space configuration 906 to UE 904. Additionally, or alternatively, in some examples, the UE 904 may be preconfigured with the CORESET and search space configuration 906 using a different mechanism. The CORESET and search space configuration 906 may include enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. In some aspects, the enhanced-coverage PDCCH procedure information may include one or more of an aggregation level or a data size associated with the associated with an aggregated set of monitoring occasions in which the UE 904 is to monitor for the PDCCH. The enhanced-coverage PDCCH procedure information may further include a duration, a repetition pattern, or other information regarding the aggregated set of monitoring occasions. In some examples, on the UE side, the enhanced-coverage PDCCH monitoring procedure may include monitoring for a same PDCCH over multiple PDCCH candidates in multiple respective monitoring occasions in a same search space with a same PDCCH candidate index.

Further, the base station 902 may transmit an enhanced-coverage PDCCH procedure activation signal 908 including an indication regarding the enhanced-coverage PDCCH monitoring procedure. Further, the base station 902 may send an enhanced-coverage PDCCH procedure activation signal 908 based at least in part on a frequency band associated with the base station, a size of a control resource set associated with the PDCCH, and/or a subcarrier spacing value. In some aspects, the indication in the enhanced-coverage PDCCH procedure activation signal 908 indicates an activation, deactivation, or continuation of the enhanced-coverage PDCCH procedure for PDCCH monitoring. In some aspects, the enhanced-coverage PDCCH procedure activation signal 908 may be a RRC configuration message including an activation indication, a MAC CE including an activation signal, a UE DCI including an activation signal, or a group-common DCI including an activation signal.

At block 910, the UE 904 may determine whether to monitor for PDCCH according to the enhanced-coverage PDCCH procedure based on their respective configurations and conditions. For example, if the enhanced-coverage PDCCH procedure activation signal 908 activates, enables, or continues the enhanced-coverage PDCCH monitoring procedure, the UE 904 may monitor for the PDCCH based on the enhanced-coverage PDCCH procedure and the CORESET and search space configuration 906. In some examples, the UEs 904 may suffer different degrees of weak or worsening beam reliability and may determine whether to activate the enhanced-coverage PDCCH procedure for PDCCH monitoring based on their respective beam reliabilities and configurations.

The base station 902 may transmit the enhanced coverage PDCCH 912 to the UE 904 including repetitions of the same PDCCH 912 over an aggregated monitoring occasion based on the CORESET and search space configuration 906. Each aggregated monitoring occasion includes at least two PDCCH monitoring occasions. In some examples, each aggregated monitoring occasion includes k consecutive PDCCH monitoring occasions corresponding to the same search space. Further, the PDCCH 912 may be transmitted using different interleaving parameter configurations during at least two of the PDCCH monitoring occasions of the aggregated monitoring occasion. For example, the PDCCH may be mapped to the CORESET via a first number of rows and/or first number of cyclic shifts during the first PDCCH monitoring occasion, and mapped to the CORESET via a second number of rows and/or second number of cyclic shifts during the second PDCCH monitoring occasion. In some aspects, the PDCCH 912 may be mapped to the CORESET using different interleaving parameter configurations for each PDCCH monitoring occasion of the aggregated monitoring occasion. Further, at block 914, the UE 904 may employ the interleaving parameter configurations to decode the CORESET and access the PDCCH 912. In addition, in some such examples, each monitoring occasion may belong to a single aggregated set of monitoring occasions, such as illustrated and described with reference to FIGS. 5 and 7. In some other examples, a monitoring occasion may belong to multiple aggregated sets of monitoring occasions, such as illustrated and described with reference to FIG. 6.

In some examples, the base station 902 may transmit an enhanced-coverage PDCCH procedure deactivation signal 916 including an indication of deactivation of an enhanced-coverage PDCCH procedure for PDCCH monitoring. Responsive to receiving such a deactivation indication, the UE 904 may stop monitoring for the PDCCH based on the enhanced-coverage PDCCH procedure in block 918. In some aspects, the enhanced-coverage PDCCH procedure deactivation signal 916 may be a RRC configuration message including a deactivation indication, a MAC CE including a deactivation signal, a UE specific DCI including a deactivation signal, or a group-common DCI including a deactivation signal. Additionally or alternatively, in some examples, the UE 904 may stop monitoring for the PDCCH 912 based on the enhanced-coverage PDCCH procedure in block 910 after a timer for the enhanced-coverage PDCCH procedure for PDCCH monitoring expires.

Further, the base station 902 may transmit a second PDCCH 920 without the enhanced-coverage PDCCH procedure after deactivating the enhanced-coverage PDCCH procedure for PDCCH. The PDCCH 920 may be transmitted without repetition and the procedure of monitoring the PDCCH 920 may be referred to as a "regular PDCCH monitoring procedure."

Figure 10:
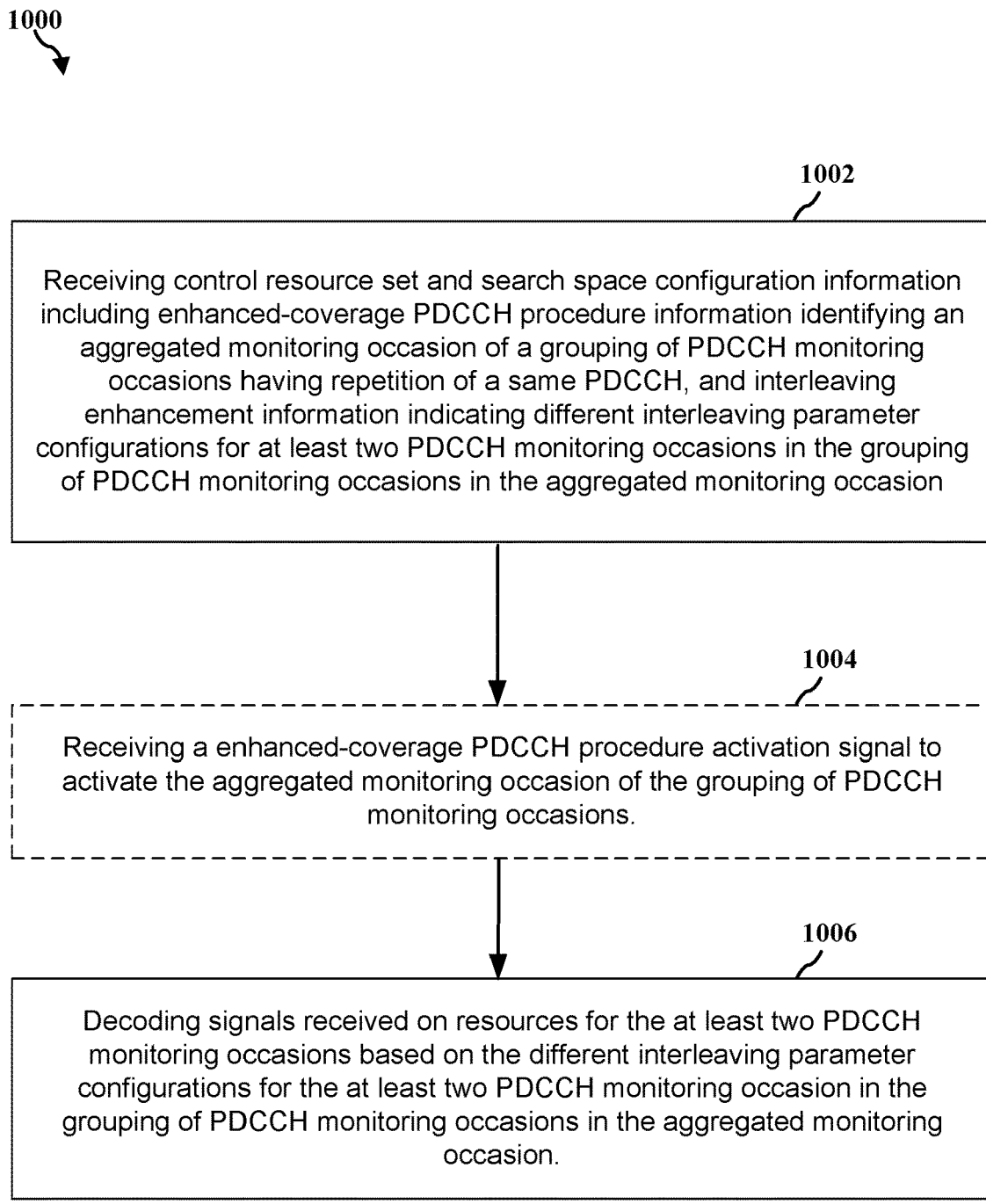
FIG. 10 is a flowchart illustrating an example method performed by a UE that supports a PDCCH interleaving enhancement procedure for an aggregated monitoring occasion in accordance with some aspects of the present disclosure.

FIG. 10 is a flowchart of a method 1000 of interleaving enhancement for an aggregated monitoring occasion. The method may be performed by a UE (e.g., the UE 104 of FIGS. 1 and 3, which may include the memory 360 and which may be the entire UE 104 or a component of the UE 104, such as the PDCCH monitoring component 140, the TX processor 368, the RX processor 356, and/or the controller/processor 359; the UE 404 of FIG. 4; and/or the UE 904 of FIG. 9).

At block 1002, the method 1000 includes receiving control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. For example, the PDCCH monitoring component 140 may receive the CORESET and search space configuration 906. Further, the CORESET and search space configuration 906 may include enhanced-coverage PDCCH procedure information and interleaving enhancement information. The enhanced-coverage PDCCH procedure information may include one or more of an aggregation level or a data size associated with an aggregated monitoring occasion in which the UE 904 is to monitor for the PDCCH 912. In addition, the enhanced-coverage PDCCH procedure information may include a duration, a repetition pattern, or other information regarding the aggregated monitoring occasion. The interleaving enhancement information may indicate different interleaving parameter configurations for each PDCCH monitoring occasion in the grouping of PDCCH monitoring occasions in the aggregated monitoring occasion. For instance, as described in detail with respect to FIG. 8, the interleaving enhancement information may indicate that the decoding component 412 should employ a first interleaving parameter configuration (e.g., two number of rows and one cyclic shift) when decoding a resource transmitted during a first monitoring occasion of an aggregated monitoring occasion, and a second interleaving parameter configuration (e.g., two number of rows and two cyclic shifts) when decoding a resource transmitted during a second monitoring occasion of the aggregated monitoring occasion.

In some aspects, the different interleaving parameter configurations comprise one or more combinations of a different number of rows, a different number of cyclic shifts, or the different number of rows and the different number of cyclic shifts used for interleaving one or more resource element group bundles of the control resource set for each of the grouping of PDCCH monitoring occasions. In some aspects, each PDCCH monitoring occasion in the grouping of PDCCH monitoring occasions in the aggregated monitoring occasion may occur during a different monitored slot of a plurality of monitored slots. Alternatively, each PDCCH monitoring occasion in the grouping of PDCCH monitoring occasions in the aggregated monitoring occasion may occur within the same monitored slot.

Accordingly, the UE 104, the UE 404, the UE 904, the TX processor 368, the RX processor 356, and/or the controller/processor 359 executing the PDCCH monitoring component 140 may provide means for receiving control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion.

At block 1004, the method 1000 may optionally include receiving an enhanced-coverage PDCCH procedure activation signal to activate the aggregated monitoring occasion of the grouping of PDCCH monitoring occasions.

For example, the PDCCH monitoring component 140 may receive the enhanced-coverage PDCCH procedure activation signal 908 indicating the initiation of a coverage-enhance mode by the base station 902. In some aspects, the enhanced-coverage PDCCH procedure activation signal 908 may be a RRC configuration message including an activation indication, a MAC CE including an activation signal, a UE specific DCI including an activation signal, or a group-common DCI including an activation signal. Further, the base station 902 may send the enhanced-coverage PDCCH procedure activation signal 908 to the UE 904 based at least in part on a frequency band associated with the base station, a size of a CORESET associated with the PDCCH, and/or a subcarrier spacing value. For example, the base station may send the enhanced-coverage PDCCH procedure activation signal 908 based at least in part on a bandwidth of the CORESET being above a first threshold for a first frequency band (e.g., FR1), or the bandwidth of the CORESET being above a second threshold for a second frequency band (e.g., FR2).

Accordingly, the UE 104, the UE 404, the UE 904, the TX processor 368, the RX processor 356, and/or the controller/processor 359 executing the PDCCH monitoring component 140 may provide means for receiving an enhanced-coverage PDCCH procedure activation signal to activate the aggregated monitoring occasion of the grouping of PDCCH monitoring occasions.

At block 1006, the method 1000 may include decoding signals received on resources for the at least two PDCCH monitoring occasions based on the different interleaving parameter configurations for the at least two PDCCH monitoring occasion in the grouping of PDCCH monitoring occasions in the aggregated monitoring occasion.

For example, the UE 404 may receive the CORESET 540 including the PDCCH candidate 530. Further, the decoding component 412 may decode the CORESET 540 to obtain the PDCCH candidate 530 using the interleaving enhancement information. In some aspects, the decoding component 412 may use the interleaving enhancement information to determine the particular interleaving parameter configuration corresponding to the first PDCCH monitoring occasion of the first aggregated monitoring occasion, and employ the interleaving parameter configuration to perform deinterleaving and/or a cyclic shift as described herein. In addition, the interleaving parameter configuration corresponding to the first PDCCH monitoring occasion of the aggregated monitoring occasion may be different from the interleaving parameter configuration corresponding to the second PDCCH monitoring occasion of the aggregated monitoring occasion in order to achieve frequency domain diversity over the monitoring occasions of the aggregated monitoring occasion.

In some aspects, the interleaving enhancement information indicates different interleaving parameter configurations for each PDCCH monitoring occasion in the grouping of PDCCH monitoring occasions in the aggregated monitoring occasion, and decoding the signals received on the resources for the at least two PDCCH monitoring occasions comprises decoding the signals received on the resources for each PDCCH monitoring occasion in the grouping of PDCCH monitoring occasions in the aggregated monitoring occasion based on the different interleaving parameter configurations.

Accordingly, the UE 104, the UE 404, the UE 904, the TX processor 368, the RX processor 356, and/or the controller/processor 359 executing the PDCCH monitoring component 140 and the decoding component 412 may provide means for receiving an enhanced-coverage PDCCH procedure activation signal to activate the aggregated monitoring occasion of the grouping of PDCCH monitoring occasions.

Figure 11:
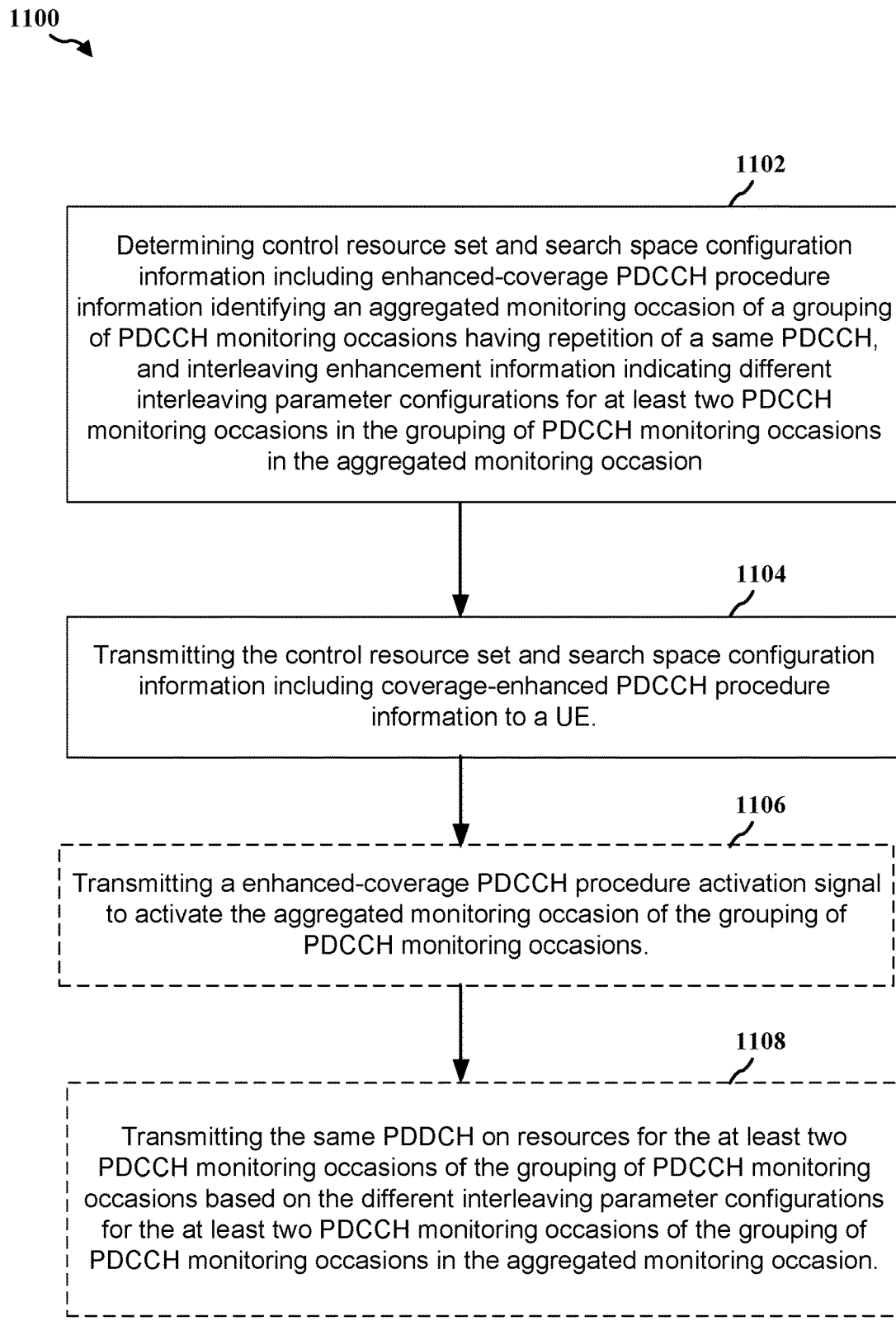
FIG. 11 is a flowchart illustrating an example method performed by a base station that supports a PDCCH interleaving enhancement procedure for an aggregated monitoring occasion in accordance with some aspects of the present disclosure.

FIG. 11 is a flowchart of a method 1100 of interleaving enhancement for an aggregated monitoring occasion. The method may be performed by a base station (e.g., the base station 102/180 of FIGS. 1 and 3, which may include the memory 376 and which may be the entire base station or a component of the base station, such as PDCCH management component 198, the TX processor 316, the RX processor 370, and/or the controller/processor 375; the base station 402 of FIG. 4; the base station 902 of FIG. 9).

At block 1102, the method 1100 includes determining control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion. For example, the PDCCH management component 198 may generate the CORESET and search space configuration 906, which includes the enhanced-coverage PDCCH procedure information and the interleaving enhancement information. The enhanced-coverage PDCCH procedure information may include one or more of an aggregation level or a data size associated with the associated with an aggregated set of monitoring occasions in which the UE 904 is to monitor for the PDCCH 912. In addition, the enhanced-coverage PDCCH procedure information may include a duration, a repetition pattern, or other information regarding the aggregated monitoring occasion. The interleaving enhancement information may indicate different interleaving parameter configurations for each PDCCH monitoring occasion in the grouping of PDCCH monitoring occasions in the aggregated monitoring occasion. For instance, as described in detail with respect to FIG. 8, the interleaving enhancement information may indicate that the decoding component 412 should employ a first interleaving parameter configuration (e.g., two number of rows and one cyclic shift) when decoding a resource transmitted during a first monitoring occasion of an aggregated monitoring occasion, and a second interleaving parameter configuration (e.g., two number of rows and two cyclic shifts) when decoding a resource transmitted during a second monitoring occasion of the aggregated monitoring occasion.

In some aspects, the different interleaving parameter configurations comprise one or more combinations of a different number of rows, a different number of cyclic shifts, or the different number of rows and the different number of cyclic shifts used for interleaving one or more resource element group bundles of the control resource set for each of the grouping of PDCCH monitoring occasions. In some aspects, each PDCCH monitoring occasion in the grouping of PDCCH monitoring occasions in the aggregated monitoring occasion may occur during a different monitored slot of a plurality of monitored slots. Alternatively, each PDCCH monitoring occasion in the grouping of PDCCH monitoring occasions in the aggregated monitoring occasion may occur within the same monitored slot.

Accordingly, the base station 102, the base station 402, the base station 902, the TX processor 316, the RX processor 370, and/or the controller/processor 375 executing the PDCCH management component 198 may provide means for determining control resource set and search space configuration information including enhanced-coverage PDCCH procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion.

At block 1104, the method 1100 may include transmitting the control resource set and search space configuration information including enhanced-coverage PDCCH procedure information to a UE. For example, the PDCCH management component 198 may transmit the CORESET and search space configuration 906 to one or more UEs, e.g., the UE 404.

Accordingly, the base station 102, the base station 402, the base station 902, the TX processor 316, the RX processor 370, and/or the controller/processor 375 executing the PDCCH management component 198 may provide means for transmitting the control resource set and search space configuration information including enhanced-coverage PDCCH procedure information to a UE.

At block 1106, the method 1100 may optionally include transmitting an enhanced-coverage PDCCH procedure activation signal to activate the aggregated monitoring occasion of the grouping of PDCCH monitoring occasions.

For example, the PDCCH management component 198 may send the UE 404 the enhanced-coverage PDCCH procedure activation signal 908 indicating the initiation of an enhanced-coverage PDCCH mode. In some aspects, the enhanced-coverage PDCCH procedure activation signal 908 may be a radio resource control (RRC) configuration message including an activation indication, a media access control (MAC) control element (CE) including an activation signal, a UE specific downlink control information (DCI) including an activation signal, or a group-common downlink control information (DCI) including an activation signal. Further, the base station 402 may send the enhanced-coverage PDCCH procedure activation signal 908 to the UE 404 based at least in part on a frequency band associated with the base station, a size of a control resource set associated with the PDCCH, and/or a subcarrier spacing value. For example, the base station may send the enhanced-coverage PDCCH procedure activation signal 908 based at least in part on a bandwidth of the CORESET being above a first threshold (e.g., 40 Mbps) for a first frequency band (e.g., FR1), or the bandwidth of the CORESET being above a second threshold (e.g., 100 Mbps) for a second frequency band (e.g., FR2).

Accordingly, the base station 102, the base station 402, the base station 902, the TX processor 316, the RX processor 370, and/or the controller/processor 375 executing the PDCCH management component 198 may provide means for transmitting an enhanced-coverage PDCCH procedure activation signal to activate the aggregated monitoring occasion of the grouping of DCCH monitoring occasions.

At block 1108, the method 1000 may optionally include transmitting the same PDCCH on resources for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion.

For example, the PDCCH management component 198 may transmit the CORESET 540 including the PDCCH candidates 530-532. In particular, the enhanced interleaving component 410 may map the PDCCH candidates 530-532 on to the CORESET 540. As described herein, the enhanced interleaving component 410 may employ a first interleaving parameter configuration to map the PDCCH candidate 530 onto to the CORESET 540 and a second interleaving parameter configuration to map the PDCCH candidate 532 onto to the CORESET 540. Further, the first interleaving parameter configuration and the second interleaving parameter configuration may configure the enhanced interleaving component 410 to employ at least a different number of rows or a different number of cyclic shifts when interleaving the REG bundles 810-815 corresponding to the PDCCH candidates 530-532.

In some aspects, the base station 902 may interleave one or more resource element group bundles of the control resource set for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion, and transmit the same PDCCH on resources for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion.

In some aspects, the base station 902 may interleave one or more resource element group bundles of the control resource set for each PDCCH monitoring occasion of the grouping of PDCCH monitoring occasions based on the different interleaving parameter configurations for each PDCCH monitoring occasion of the grouping of PDCCH monitoring occasions in the aggregated monitoring occasion, and transmit the same PDCCH on resources for each PDCCH monitoring occasion of the grouping of PDCCH monitoring occasions based on the different interleaving parameter configurations for each PDCCH monitoring occasions of the grouping of PDCCH monitoring occasions in the aggregated monitoring occasion.

Accordingly, the base station 102, the base station 402, the base station 902, the TX processor 316, the RX processor 370, and/or the controller/processor 375 executing the PDCCH management component 198 and the enhanced interleaving component 4XX may provide means for transmitting the same PDCCH on resources for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), comprising: receiving control resource set and search space configuration information including enhanced-coverage physical downlink control channel (PDCCH) procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion; and decoding signals received on resources for the at least two PDCCH monitoring occasions based on the different interleaving parameter configurations for the at least two PDCCH monitoring occasion in the grouping of PDCCH monitoring occasions in the aggregated monitoring occasion.

B. The method as paragraph A recites, wherein the different interleaving parameter configurations comprise a different number of rows used for interleaving one or more resource element group bundles of the control resource set for each of the grouping of PDCCH monitoring occasions.

C. The method as paragraph A recites, wherein the different interleaving parameter configurations comprise a different number of cyclic shifts used for interleaving one or more resource element group bundles of the control resource set for each of the grouping of PDCCH monitoring occasions.

D. The method as paragraph A recites, wherein the different interleaving parameter configurations comprise one or more combinations of a different number of rows, a different number of cyclic shifts, or the different number of rows and the different number of cyclic shifts used for interleaving one or more resource element group bundles of the control resource set for each of the grouping of PDCCH monitoring occasions.

E. The method as paragraph D recites, further comprising determining a number of cyclic shifts of the different number of cyclic shifts for an individual PDCCH monitoring occasion in the grouping of PDCCH monitoring occasions in the aggregated monitoring occasion based on an initial symbol of the individual PDCCH monitoring occasion.

F. The method as any of paragraphs A-E recite, wherein the interleaving enhancement information indicates different interleaving parameter configurations for each PDCCH monitoring occasion in the grouping of PDCCH monitoring occasions in the aggregated monitoring occasion, and wherein decoding the signals received on the resources for the at least two PDCCH monitoring occasions comprises decoding the signals received on the resources for each PDCCH monitoring occasion in the grouping of PDCCH monitoring occasions in the aggregated monitoring occasion based on the different interleaving parameter configurations.

G. The method as any of paragraphs A-E recite, further comprising receiving an enhanced-coverage PDCCH procedure activation signal to activate the aggregated monitoring occasion of the grouping of PDCCH monitoring occasions.

H. The method as paragraph G recites, wherein receiving the enhanced-coverage PDCCH procedure activation signal includes receiving an activation indication in a radio resource control (RRC) configuration message.

I. The method as paragraph G recites, wherein receiving the enhanced-coverage PDCCH procedure activation signal includes receiving an activation indication in a media access control (MAC) control element (CE).

J. The method as paragraph G recites, wherein receiving the enhanced-coverage PDCCH procedure activation signal includes receiving an activation indication in a UE specific downlink control information (DCI).

K. The method as paragraph G recites, wherein receiving the enhanced-coverage PDCCH procedure activation signal includes receiving an activation indication in a group-common downlink control information (DCI).

L. The method as paragraph G recites, wherein receiving the enhanced-coverage PDCCH procedure activation signal includes receiving the enhanced-coverage PDCCH procedure activation signal from a base station based at least in part on a frequency band associated with the base station, a size of a control resource set associated with the PDCCH, and/or a subcarrier spacing value.

M. The method as any of paragraphs A-L recite, wherein each PDCCH monitoring occasion in the grouping of PDCCH monitoring occasions in the aggregated monitoring occasion occurs during a different monitored slot of a plurality of monitored slots.

N. The method as any of paragraphs A-L recite, wherein each PDCCH monitoring occasion in the grouping of PDCCH monitoring occasions in the aggregated monitoring occasion occurs within a same monitored slot.

O. A UE for wireless communication, comprising a memory storing computer-executable instructions; and at least one processor coupled with the memory and configured to execute the computer-executable instructions to perform the method of any of paragraphs A-N.

P. A UE for wireless communication, comprising means for performing the method of any of paragraphs A-N.

Q. A non-transitory computer-readable medium storing computer executable code, the code when executed by a processor causes the processor to perform the method of any of paragraphs A-N.

R. A method of wireless communication at a base station, comprising: determining control resource set and search space configuration information including enhanced-coverage physical downlink control channel (PDCCH) procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion; and transmitting the control resource set and search space configuration information including enhanced-coverage PDCCH procedure information to a user equipment (UE).

S. The method as paragraph R recites, wherein the different interleaving parameter configurations comprise a different number of rows used for interleaving one or more resource element group bundles of the control resource set for each of the grouping of PDCCH monitoring occasions.

T. The method as paragraph R recites, wherein the different interleaving parameter configurations comprise a different number of cyclic shifts used for interleaving one or more resource element group bundles of the control resource set for each of the grouping of PDCCH monitoring occasions.

U. The method as paragraph R recites, wherein the different interleaving parameter configurations comprise one or more combinations a different number of rows, a different number of cyclic shifts, or the different number of rows and the different number of cyclic shifts used for interleaving one or more resource element group bundles of the control resource set for each of the grouping of PDCCH monitoring occasions.

V. The method as paragraph U recites, further comprising determining a number of cyclic shifts for an individual PDCCH monitoring occasion in the grouping of PDCCH monitoring occasions in the aggregated monitoring occasion based on an initial symbol of the individual PDCCH monitoring occasion.

X. The method as any of paragraphs R-V recite, further comprising: interleaving one or more resource element group bundles of the control resource set for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion; and transmitting the same PDCCH on resources for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion.

Y. The method as any of paragraphs R-X recite, wherein the interleaving enhancement information indicates different interleaving parameter configurations for each PDCCH monitoring occasion in the grouping of PDCCH monitoring occasions in the aggregated monitoring occasion, and further comprising: interleaving one or more resource element group bundles of the control resource set for each PDCCH monitoring occasion of the grouping of PDCCH monitoring occasions based on the different interleaving parameter configurations for each PDCCH monitoring occasion of the grouping of PDCCH monitoring occasions in the aggregated monitoring occasion; and transmitting the same PDCCH on resources for each PDCCH monitoring occasion of the grouping of PDCCH monitoring occasions based on the different interleaving parameter configurations for each PDCCH monitoring occasion of the grouping of PDCCH monitoring occasions in the aggregated monitoring occasion.

Z. The method as any of paragraphs R-Y recite, further comprising transmitting an enhanced-coverage PDCCH procedure activation signal to activate the aggregated monitoring occasion of the grouping of PDCCH monitoring occasions.

AA. The method as paragraph Z recites, wherein transmitting the enhanced-coverage PDCCH procedure activation signal includes transmitting an activation indication in a radio resource control (RRC) configuration message.

AB. The method as paragraph Z recites, wherein transmitting the enhanced-coverage PDCCH procedure activation signal includes transmitting an activation indication in a media access control (MAC) control element (CE).

AC. The method as paragraph Z recites, wherein transmitting the enhanced-coverage PDCCH procedure activation signal includes transmitting an activation indication in a UE specific downlink control information (DCI) and/or a group-common downlink control information (DCI).

AD. The method as paragraph Z recites, wherein transmitting the enhanced-coverage PDCCH procedure activation signal includes determining to transmit the enhanced-coverage PDCCH procedure indicator based at least in part on a frequency band associated with the base station, a size of a control resource set associated with the PDCCH, and/or a sub carrier spacing value.

AE. The method as any of paragraphs R-AD recite, wherein each PDCCH monitoring occasion in the grouping of PDCCH monitoring occasions in the aggregated monitoring occasion occurs during a different monitored slot of a plurality of monitored slots.

AF. The method as any of paragraphs R-AD recite, wherein each PDCCH monitoring occasion in the grouping of PDCCH monitoring occasions in the aggregated monitoring occasion occurs during a same monitored slot.

AG. A base station for wireless communication, comprising a memory storing computer-executable instructions; and at least one processor coupled with the memory and configured to execute the computer-executable instructions to perform the method of any of paragraphs R-AF.

AH. A base station for wireless communication, comprising means for performing the method of any of paragraphs R-AF.

AI. A non-transitory computer-readable medium storing computer executable code, the code when executed by a processor causes the processor to perform the method of any of paragraphs R-AF.

What is claimed is:

1. A method of wireless communication at a user equipment (UE), comprising:
receiving an enhanced-coverage physical downlink control channel (PDCCH) procedure activation signal to activate aggregated monitoring of a grouping of PDCCH monitoring occasions;
receiving, based on the enhanced-coverage PDCCH procedure activation signal, control resource set and search space configuration information including enhanced-coverage PDCCH procedure information identifying an aggregated monitoring occasion of the grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion; and
decoding signals received on resources for the at least two PDCCH monitoring occasions in the grouping of PDCCH monitoring occasions based on the different interleaving parameter configurations.

2. The method of claim 1, wherein the different interleaving parameter configurations comprise a different number of rows used for interleaving one or more resource element group bundles of the control resource set for each PDCCH monitoring occasion in the grouping of PDCCH monitoring occasions.

3. The method of claim 1, wherein the different interleaving parameter configurations comprise a different number of cyclic shifts used for interleaving one or more resource element group bundles of the control resource set for each PDCCH monitoring occasion in the grouping of PDCCH monitoring occasions.

4. The method of claim 1, wherein the different interleaving parameter configurations comprise one or more combinations of a different number of rows, a different number of cyclic shifts, or the different number of rows and the different number of cyclic shifts used for interleaving one or more resource element group bundles of the control resource set for each PDCCH monitoring occasion in the grouping of PDCCH monitoring occasions.

5. The method of claim 4, further comprising determining a number of cyclic shifts of the different number of cyclic shifts for an individual PDCCH monitoring occasion in the grouping of PDCCH monitoring occasions in the aggregated monitoring occasion based on an initial symbol of the individual PDCCH monitoring occasion.

6. The method of claim 1, wherein the interleaving enhancement information indicates different interleaving parameter configurations for each PDCCH monitoring occasion in the grouping of PDCCH monitoring occasions in the aggregated monitoring occasion, and wherein decoding the signals received on the resources for the at least two PDCCH monitoring occasions comprises decoding the signals received on the resources for each PDCCH monitoring occasion in the grouping of PDCCH monitoring occasions in the aggregated monitoring occasion based on the different interleaving parameter configurations.

7. The method of claim 1, wherein receiving the enhanced-coverage PDCCH procedure activation signal includes receiving an activation indication in a radio resource control (RRC) configuration message.

8. The method of claim 1, wherein receiving the enhanced-coverage PDCCH procedure activation signal includes receiving an activation indication in a media access control (MAC) control element (CE).

9. The method of claim 1, wherein receiving the enhanced-coverage PDCCH procedure activation signal includes receiving an activation indication in a UE specific downlink control information (DCI).

10. The method of claim 1, wherein receiving the enhanced-coverage PDCCH procedure activation signal includes receiving an activation indication in a group-common downlink control information (DCI).

11. The method of claim 1, wherein receiving the enhanced-coverage PDCCH procedure activation signal includes receiving the enhanced-coverage PDCCH procedure activation signal from a base station based at least in part on a frequency band associated with the base station, a size of a control resource set associated with the PDCCH, and/or a subcarrier spacing value.

12. The method of claim 1, wherein each PDCCH monitoring occasion in the grouping of PDCCH monitoring occasions in the aggregated monitoring occasion occurs during a different monitored slot of a plurality of monitored slots.

13. The method of claim 1, wherein each PDCCH monitoring occasion in the grouping of PDCCH monitoring occasions in the aggregated monitoring occasion occurs within a same monitored slot.

14. A user equipment for wireless communication, comprising:
a memory storing computer-executable instructions; and
at least one processor coupled with the memory and configured to execute the computer-executable instructions to:
receive an enhanced-coverage physical downlink control channel (PDCCH) procedure activation signal to activate aggregated monitoring of a grouping of PDCCH monitoring occasions;
receive, based on the enhanced-coverage PDCCH procedure activation signal, control resource set and search space configuration information including enhanced-coverage PDCCH procedure information identifying an aggregated monitoring occasion of the grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion; and decode signals received on resources for the at least two PDCCH monitoring occasions in the grouping of PDCCH monitoring occasions based on the different interleaving parameter configurations.

15. A method of wireless communication at a base station, comprising:
determining control resource set and search space configuration information including enhanced-coverage physical downlink control channel (PDCCH) procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion;
transmitting an enhanced-coverage PDCCH procedure activation signal to activate aggregated monitoring of the grouping of PDCCH monitoring occasions; and
transmitting, based on the enhanced-coverage PDCCH procedure activation signal, the control resource set and search space configuration information including enhanced-coverage PDCCH procedure information to a user equipment (UE).

16. The method of claim 15, wherein the different interleaving parameter configurations comprise a different number of rows used for interleaving one or more resource element group bundles of the control resource set for each PDCCH monitoring occasion in the grouping of PDCCH monitoring occasions.

17. The method of claim 15, wherein the different interleaving parameter configurations comprise a different number of cyclic shifts used for interleaving one or more resource element group bundles of the control resource set for each PDCCH monitoring occasion in the grouping of PDCCH monitoring occasions.

18. The method of claim 15, wherein the different interleaving parameter configurations comprise one or more combinations a different number of rows, a different number of cyclic shifts, or the different number of rows and the different number of cyclic shifts used for interleaving one or more resource element group bundles of the control resource set for each PDCCH monitoring occasion in the grouping of PDCCH monitoring occasions.

19. The method of claim 18, further comprising determining a number of cyclic shifts for an individual PDCCH monitoring occasion in the grouping of PDCCH monitoring occasions in the aggregated monitoring occasion based on an initial symbol of the individual PDCCH monitoring occasion.

20. The method of claim 15, further comprising:
interleaving one or more resource element group bundles of the control resource set for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion; and
transmitting the same PDCCH on resources for the at least two PDCCH monitoring occasions of the grouping of PDCCH monitoring occasions based on the different interleaving parameter configurations for the at least two PDCCH monitoring occasions of the grouping of PDCCH monitoring occasions in the aggregated monitoring occasion.

21. The method of claim 15, wherein the interleaving enhancement information indicates different interleaving parameter configurations for each PDCCH monitoring occasion in the grouping of PDCCH monitoring occasions in the aggregated monitoring occasion, and further comprising:
- interleaving one or more resource element group bundles of the control resource set for each PDCCH monitoring occasion of the grouping of PDCCH monitoring occasions based on the different interleaving parameter configurations for each PDCCH monitoring occasion of the grouping of PDCCH monitoring occasions in the aggregated monitoring occasion; and
- transmitting the same PDCCH on resources for each PDCCH monitoring occasion of the grouping of PDCCH monitoring occasions based on the different interleaving parameter configurations for each PDCCH monitoring occasions of the grouping of PDCCH monitoring occasions in the aggregated monitoring occasion.

22. The method of claim 15, wherein transmitting the enhanced-coverage PDCCH procedure activation signal includes transmitting an activation indication in a radio resource control (RRC) configuration message.

23. The method of claim 15, wherein transmitting the enhanced-coverage PDCCH procedure activation signal includes transmitting an activation indication in a media access control (MAC) control element (CE).

24. The method of claim 15, wherein transmitting the enhanced-coverage PDCCH procedure activation signal includes transmitting an activation indication in a UE specific downlink control information (DCI) and/or a group-common downlink control information (DCI).

25. The method of claim 15, wherein transmitting the enhanced-coverage PDCCH procedure activation signal includes determining to transmit the enhanced-coverage PDCCH procedure activation signal based at least in part on a frequency band associated with the base station, a size of a control resource set associated with the PDCCH, and/or a sub carrier spacing value.

26. The method of claim 15, wherein each PDCCH monitoring occasion in the grouping of PDCCH monitoring occasions in the aggregated monitoring occasion occurs during a different monitored slot of a plurality of monitored slots.

27. The method of claim 15, wherein each PDCCH monitoring occasion in the grouping of PDCCH monitoring occasions in the aggregated monitoring occasion occurs during a same monitored slot.

28. A base station for wireless communication, comprising:
- a memory storing computer-executable instructions; and
- at least one processor coupled with the memory and configured to execute the computer-executable instructions to:
  - determine control resource set and search space configuration information including enhanced-coverage physical downlink control channel (PDCCH) procedure information identifying an aggregated monitoring occasion of a grouping of PDCCH monitoring occasions having repetition of a same PDCCH, and interleaving enhancement information indicating different interleaving parameter configurations for at least two PDCCH monitoring occasions in the grouping of PDCCH monitoring occasions in the aggregated monitoring occasion;
  - transmit an enhanced-coverage PDCCH procedure activation signal to activate aggregated monitoring of the grouping of PDCCH monitoring occasions; and
  - transmit, based on the enhanced-coverage PDCCH procedure activation signal, the control resource set and search space configuration information including enhanced-coverage PDCCH procedure information to a user equipment (UE).

* * * * *